United States Patent [19]
Harper et al.

[11] Patent Number: 5,560,024
[45] Date of Patent: Sep. 24, 1996

[54] COMPUTER POWER MANAGEMENT SYSTEM

[75] Inventors: Leroy D. Harper, Sunnyvale; Grayson C. Schlichting, Cupertino; Douglas A. Hooks, Sunnyvale; Ian H. S. Cullimore, Palo Alto; Gavin A. Bradshaw, Cupertino; Biswa R. Banerjee, San Jose; John P. Fairbanks; Roderick W. Stone, both of Sunnyvale, all of Calif.

[73] Assignee: Fujitsu Personal Systems, Inc., Santa Clara, Calif.

[21] Appl. No.: 384,284

[22] Filed: Feb. 1, 1995

Related U.S. Application Data

[62] Division of Ser. No. 87,249, Jul. 1, 1993, abandoned, which is a division of Ser. No. 436,642, Nov. 13, 1989, abandoned, which is a continuation-in-part of Ser. No. 373,440, Jun. 30, 1989, abandoned.

[51] Int. Cl.⁶ ..................................... G06F 1/08
[52] U.S. Cl. .................. 395/750; 364/DIG. 1; 364/270; 364/270.2; 364/273; 364/273.1; 364/273.2
[58] Field of Search ................. 395/750, 550; 364/707

[56] References Cited

U.S. PATENT DOCUMENTS

| | | | |
|---|---|---|---|
| 3,941,989 | 3/1976 | McLaughlin et al. | 395/750 |
| 4,129,091 | 11/1978 | Yorimoto et al. | 395/750 |
| 4,137,563 | 1/1979 | Tsunoda | 395/550 |
| 4,203,153 | 5/1980 | Boyd | 395/750 |
| 4,279,020 | 7/1981 | Christian et al. | 395/750 |
| 4,317,180 | 2/1982 | Lies | 395/750 |
| 4,317,181 | 2/1982 | Teza et al. | 179/81 |
| 4,409,665 | 10/1983 | Tubbs | 364/707 |
| 4,435,761 | 3/1984 | Kimoto | 395/550 |
| 4,455,623 | 6/1984 | Wesemeyer et al. | 395/425 |
| 4,463,440 | 7/1984 | Nishiura et al. | 395/550 |
| 4,479,191 | 10/1984 | Nojima et al. | 364/707 |
| 4,545,030 | 10/1985 | Kitchin | 395/750 |
| 4,554,630 | 11/1985 | Sargent et al. | 395/575 |
| 4,570,219 | 2/1986 | Shibukawa et al. | 395/775 |
| 4,573,117 | 2/1986 | Boney | 395/750 |

(List continued on next page.)

FOREIGN PATENT DOCUMENTS

| | | |
|---|---|---|
| 0229692A3 | 7/1986 | European Pat. Off. . |
| 0265209A1 | 4/1988 | European Pat. Off. . |
| 0303020 | 2/1989 | European Pat. Off. .......... G06F 1/00 |
| 2080585 | 2/1982 | United Kingdom . |

OTHER PUBLICATIONS

Abstract—JP–A–58 171842, vol. 008 No. 008 (E–221), 13 Jan. 1984, (Matsushita Denshi Kogyo KK) Oct. 8, 1983.

(List continued on next page.)

*Primary Examiner*—Ayaz R. Sheikh
*Attorney, Agent, or Firm*—Skjerven, Morrill, MacPherson, Franklin & Friel; Norman R. Klivans

[57] ABSTRACT

A low power management system including both hardware and software is provided for a battery powered portable computer. The low power management system powers down various sections of the computer when they are not used. The low power management system is controlled by a control program in the microprocessor of the computer. The low power management system includes the capability to turn off clock signals to various sections of the computer based upon demand. Also included is the capability to turn on clock signals based upon demand. The low power management system also includes the capability to turn on the computer upon a press of a key on the computer keyboard. The low power management system monitors software application programs for keyboard activity so as to turn off the microprocessor in the computer in response to a loop looking for a keypress and certain other loops which can be monitored without use of the microprocessor.

13 Claims, 14 Drawing Sheets

Microfiche Appendix Included
(4 Microfiche, 190 Pages)

U.S. PATENT DOCUMENTS

| | | | |
|---|---|---|---|
| 4,612,418 | 9/1986 | Takeda et al. | 179/81 |
| 4,615,005 | 9/1986 | Maejima et al. | 395/550 |
| 4,669,059 | 5/1987 | Little et al. | 395/750 |
| 4,698,748 | 10/1988 | Juzswik et al. | 395/750 |
| 4,747,041 | 5/1988 | Engel et al. | 395/750 |
| 4,748,559 | 5/1988 | Smith et al. | 395/750 |
| 4,758,945 | 7/1988 | Remedi | 364/750 |
| 4,780,843 | 10/1988 | Tietjen | 395/725 |
| 4,809,163 | 2/1989 | Hirosawa et al. | 395/750 |
| 4,819,164 | 4/1989 | Branson | 395/550 |
| 4,823,292 | 4/1989 | Hillion | 364/707 |
| 4,825,358 | 4/1989 | Letwin | 395/700 |
| 4,825,407 | 4/1989 | Loessel et al. | 395/750 |
| 4,841,440 | 6/1989 | Yonezu et al. | 395/550 |
| 4,851,987 | 7/1989 | Day | 395/550 |
| 4,870,570 | 10/1989 | Satoh et al. | 395/750 |
| 4,881,205 | 11/1989 | Aihara | 365/222 |
| 4,893,271 | 1/1990 | Davis et al. | 395/750 |
| 4,907,150 | 3/1990 | Arroyo et al. | 395/575 |
| 4,980,836 | 12/1990 | Carter et al. | 364/483 |
| 5,025,387 | 6/1991 | Franc | 364/493 |
| 5,041,964 | 8/1991 | Cole et al. | 395/750 |
| 5,083,266 | 1/1992 | Watanabe | 395/275 |
| 5,086,387 | 2/1992 | Arroyo et al. | 395/750 |
| 5,121,500 | 6/1992 | Arlington et al. | 395/750 |
| 5,167,024 | 11/1992 | Smith et al. | 395/750 |
| 5,201,059 | 4/1993 | Nguyen | 395/750 |
| 5,218,704 | 6/1993 | Watts, Jr. et al. | 395/750 |
| 5,222,239 | 6/1993 | Rosch et al. | 395/750 |
| 5,237,697 | 8/1993 | Nakano | 395/750 |
| 5,247,655 | 9/1993 | Khan et al. | 395/750 |

OTHER PUBLICATIONS

Abstract—JP-A-02 105213, vol. 014 No. 321 (P-1074), 10 Jul. 1990, (Mitsubishi Electric Corp.) Apr. 17, 1990.

Electronic Design vol. 32, No. 20, 4 Oct. 1984, Waseca, Minnsota, USA pp. 185–191; C. A. Mroz et al.: Advances Clock Controller Cuts Power Needs, Size Of Static CMOS Systems *p. 187, left column, line 10–right column, *line 4, p. 188, right column, line 10–line 43 *p. 191, left column, line 6—right column, line 6*.

Hewlett–Packard Journal vol. 37, No. 7, Jul. 1986, Amstelveen, Netherlands pp. 4–13; J. T. Eaton et al: "Design Of HP's Portable Computer Family" *p. 5, right column, line 28—line 51* *p. 10, left column, line 1—p. 11, left column, line 40*.

Brownstein, Mark, et al., "Quarterdeck Plans to Collect Fees on Desqview Patent", Infoworld, Apr. 24, 1989.

The following is a definition of the I/O map Table 1 show the ports included that are compatible with the IBM PC/XT, while Tables 2 and 3 show the Poqet specific I/O for the *SYSTEM* ASIC and *PERIPHERAL* ASIC respectively.

TABLE 1
IBM PC/XT COMPATIBLE I/O

| I/O Address | Usage |
|---|---|
| 0000-001F | DMA Controller internal registers |
| 0020-003F | Interrupt Controller internal registers |
| 0060-0063 | PPI Internal I/O |
| 0080-009F | DMA Page Registers |
| 00A0-00BF | NMI Mask Register |
| 03B0-03BB | Monochrome Display Adapter registers |
| 03D0-03DF | Color Graphics Adapter registers |
| 03F8-03FF | Primary Asynchronous Adapter registers |

TABLE 2
*SYSTEM* ASIC POQET PQ-XT SPECIFIC I/O

| Port Address | Bit | Value | Description |
|---|---|---|---|
| F6C0 | 0 | 1 | Map device connected to EMCS0 to C0000 - CFFFFh |
| 00h at Reset | 1 | 1 | Map device connected to EMCS1 to C0000 - CFFFFh |
| | 2 | 1 | Map device connected to EMCS2 to C0000 - CFFFFh |
| | 3 | 1 | Map device connected to EMCS3 to C0000 - CFFFFh |
| | 4 | 1 | Map device connected to EMCS0 to D0000 - DFFFFh |
| | 5 | 1 | Map device connected to EMCS1 to D0000 - DFFFFh |
| | 6 | 1 | Map device connected to EMCS2 to D0000 - DFFFFh |
| | 7 | 1 | Map device connected to EMCS3 to D0000 - DFFFFh |
| F6C1 00h at Reset | 0-6 | 0-7Fh | Device page to be mapped to C0000 - CFFFFh |
| F6C2 00h at Reset | 0-6 | 0-7Fh | Device page to be mapped to D0000 - DFFFFh |
| F6C3 00h at Reset | 0-1 | 0h | Selected 0 wait states for memory cycles |
| | | 1h | Selected 1 wait state for memory cycles |
| | | 2h | Selected 2 wait state for memory cycles |
| | | 3h | Selected 3 wait state for memory cycles |

| | | | |
|---|---|---|---|
| F6C4<br>00h at Reset | 0<br>1-7 | 1 | Enable Error NMI<br>Reserved |
| F6C5<br>80h at Reset | 0<br>1<br>2<br>3<br>4<br>5<br>6<br>7 | 1<br>1<br>1<br>1<br>1<br>1<br>1<br>1 | Map device connected to EMCS0 to E0000 - EFFFFh<br>Map device connected to EMCS1 to E0000 - EFFFFh<br>Map device connected to EMCS2 to E0000 - EFFFFh<br>Map device connected to EMCS3 to E0000 - EFFFFh<br>Map device connected to EMCS0 to E0000 - FFFFFh<br>Map device connected to EMCS1 to E0000 - FFFFFh<br>Map device connected to EMCS2 to E0000 - FFFFFh<br>Map device connected to EMCS3 to E0000 - FFFFFh |
| F6C6<br>00h at Reset | 0-6 | 0-7Fh | Device page to be mapped to E0000 - EFFFFh |
| F6C7<br>FFh at Reset | 0-6 | 0-7Fh | Device page to be mapped to F0000 - FFFFFh |
| F6E4<br>00h at Reset<br>AFFFFh | 0-3<br>4<br>5-7 | 1 | Reserved for *PERIPHERAL* ASIC<br>Assert DISEXPP on accesses to A8000 -<br>Reserved for *PERIPHERAL* ASIC |

TABLE 3
*PERIPHERAL* ASIC POQET PQ-XT SPECIFIC I/O

| Port Address | Bit | Value | Description |
|---|---|---|---|
| F6E0<br>R/W<br>00h at Reset | 0-3<br><br><br><br><br>4-5<br>6-7 | 0-Fh<br><br><br><br><br>0-3h<br>0-3h | Duty cycle of the contrast signal.<br>0h corresponds to 1/16 duty cycle,<br>1h corresponds to 2/16 duty cycle,...<br>Eh corresponds to 15/16 duty cycle,<br>Fh corresponds to 15/16 duty cycle.<br>Initial keyboard repeat delay<br>Subsequent keyboard repeat delay |
| F6E1<br>R/W<br>00h at Reset | 0<br><br>1<br>2<br>3<br><br>4<br>5<br>6<br>7 | 0<br>1<br>1<br>1<br>1<br><br>1<br>1<br>1<br>1 | MDA compatible display<br>CGA compatible display<br>Disable the internal display<br>Disable the character blinking feature<br>Disable the automatic updating of bit-map memory by the display controller<br>Disable the UART from the I/O bus<br>Masks IRQ0's from waking the system clock<br>Masks IRQ1's from waking the system clock<br>Masks IRQ4's from waking the system clock |

| | | | |
|---|---|---|---|
| F6E2<br>W only<br>00h at Reset | 0-3<br>4-7 | 0-Fh<br>0-Fh | PC/XT compatible dip switches 5-8.<br>PC/XT compatible dip switches 1-4. |
| F6E3<br>R only | 0<br>1<br>2<br>3<br>4<br><br>5<br>6<br>7 | 1<br>1<br>0<br>0<br>0<br><br>0<br>0<br>1 | EXTRA input signal is active (high).<br>LOWBAT input signal is active (high).<br>PQKEYN input signal is active (low).<br>ONOFFN input signal is active (low).<br>PERCLKN input signal is active (low).<br>EXTSYSCLK is in use.<br>CALMAN input is active (low).<br>CALMBN input is active (low).<br>Display controller is in a state to which<br>the system clock may be stopped. |
| F6E4<br>R/W<br>0Xh at Reset | 0<br>1<br>2<br>3<br>4<br><br>5<br><br>6<br>7 | 0<br>0<br>0<br>0<br>1<br><br>0<br>1<br>1<br>1 | CDET1AN input is active (low).<br>CDET2AN input is active (low).<br>CDET1BN input is active (low).<br>CDET2BN input is active (low).<br>Enable access to font ROM/RAM<br>at A8000 - AFFFFh.<br>LOWBAT signal indicates a dead battery<br>LOWBAT signal indicates a low battery<br>Clear 54.9 ms increment counter.<br>INT16h has been called since the last time<br>NMI's were cleared. |
| F6E5<br>R only | 0-7 | 0-FFh | Least significant byte of the 54.9 ms<br>increment counter. |
| F6E6<br>R only | 0-1<br>2-7 | 0-3h | Most significant bits of the 54.9 ms<br>increment counter<br>Reserved |
| F6E7<br>R only | 0-1<br><br><br>2<br>3-5 | 0h<br>1h<br>2-3h<br>1<br>0h<br><br>1h<br><br>2h<br><br>3h<br><br>4h<br><br>5h<br><br>6h<br><br>7h | Select 40 x 25 text mode (CGA only)<br>Select 80 x 25 text mode<br>Select graphics mode (CGA only)<br>Enable the display controller to refresh<br>the LCD.<br>Display B8000-B8FFFh (CGA 80 x 25 text only).<br>Display B8000-B87FFh (CGA 40 x 25 text only).<br>Display B8000-B8FFFh (CGA 80 x 25 text only).<br>Display B87FF-B8FFFh (CGA 40 x 25 text only).<br>Display B9000-B9FFFh (CGA 80 x 25 text only).<br>Display B97FF-B9FFFh (CGA 40 x 25 text only).<br>Display B9000-B9FFFh (CGA 80 x 25 text only).<br>Display B97FF-B9FFFh (CGA 40 x 25 text only).<br>Display BA000-BAFFFh (CGA 80 x 25 text only).<br>Display BA7FF-BAFFFh (CGA 40 x 25 text only).<br>Display BA000-BAFFFh (CGA 80 x 25 text only).<br>Display BA7FF-BAFFFh (CGA 40 x 25 text only).<br>Display BB000-BBFFFh (CGA 80 x 25 text only).<br>Display BB7FF-BBFFFh (CGA 40 x 25 text only).<br>Display BB000-BBFFFh (CGA 80 x 25 text only).<br>Display BB7FF-BBFFFh (CGA 40 x 25 text only). |
| | 6 | 1 | IRQ0 timer interrupt has occured since the |

FIG. 5C

| | | | |
|---|---|---|---|
| | 7 | 1 | last time NMI's were cleared.<br>IRQ1 keyboard interrupt has occurred since the last time NMI's were cleared. |
| F6E8<br>R/W<br>00h at Reset | 0<br>1<br>2<br>3<br>4<br>5<br>6<br>7 | 1<br>1<br>1<br>1<br>1<br>1<br>1<br>1 | Enable the EXTRA signal to generate an NMI.<br>Enable the LOWBAT signal to generate an NMI.<br>Enable any of the NMI if they are individually enabled.<br>Enable the video controller to generate an NMI when video display pages are changed.<br>Enable the PQKEYN signal to generate an NMI.<br>Enable the ONOFFN signal to generate an NMI.<br>Enable the IOCHKN signal to generate an NMI.<br>Enable the CALMAN and CALMBN to generate an NMI. |
| F6E9<br>R/W<br>00h at Reset | 0<br>1<br>2<br>3<br>4<br>5<br>6<br>7 | 1<br>1<br>1<br>1<br>1<br>1<br>1<br>0 | Enable the CDET1AN signal to generate an NMI.<br>Enable the CDET2AN signal to generate an NMI.<br>Enable the CDET1BN signal to generate an NMI.<br>Enable the CDET2BN signal to generate an NMI.<br>Enable an IRQ0 request to generate an NMI.<br>Enable an IRQ1 request to generate an NMI.<br>Enable NMI's for reading 00058h (INT16h).<br>Clear all NMI's and indicator latches. |
| F6EA<br>R only | 0<br>1<br>2<br>3<br>4<br>5<br>6<br>7 | 1<br>1<br>1<br>1<br>1<br>1<br>1<br>1 | Signal ONOFFN has been active since the last time NMI's were cleared.<br>Signal PQKEYN has been active since the last time NMI's were cleared.<br>The display page register has been written since the last time NMI's were cleared<br>The *PERIPHERAL* ASIC generated an NMI.<br>One of either CALMAN or CALMBN signal has been active since the last time NMI's were cleared.<br>Signal LOWBAT has been active since the last time NMI's were cleared.<br>Signal EXTRA has been active since the last time NMI's were cleared.<br>Signal IOCHKN has been active since the last time NMI's were cleared. |
| F6EB<br>R only | 0<br>1<br>2<br>3<br>4 | 1<br>1<br>1<br>1<br>1 | Signal CDET1AN has made a 0-1 transition since the last time NMI's were cleared.<br>Card a extended pin out-going NMI.<br>Signal CDET1AN has made a 1-0 transition since the last time NMI's were cleared.<br>Card a extended pin in-coming NMI.<br>Signal CDET2AN has made a 0-1 transition since the last time NMI's were cleared.<br>Card a micro switch out-going NMI.<br>Signal CDET2AN has made a 1-0 transition since the last time NMI's were cleared.<br>Card a micro switch in-coming NMI.<br>Signal CDET1BN has made a 0-1 transition since the last time NMI's were cleared. |

FIG. 5D

| | | | |
|---|---|---|---|
| | 5 | 1 | Card a extended pin out-going NMI. Signal CDET1BN has made a 1-0 transition since the last time NMI's were cleared. Card a extended pin in-coming NMI. |
| | 6 | 1 | Signal CDET2BN has made a 0-1 transition since the last time NMI's were cleared. Card a micro switch out-going NMI. |
| | 7 | 1 | Signal CDET2BN has made a 1-0 transition since the last time NMI's were cleared. Card a micro switch in-coming NMI. |
| F6EC R/W 00h at Reset | 0 | 0 | Timer generates IRQ0's every 54.9 ms. |
| | | 1 | Timer generates IRQ0's every 56.2 s. |
| | 1 | 0 | Reserved always 0. |
| | 2 | 0 | SELVDD output low (5 Volts) if F6ECh bit 4 is low. |
| | | 1 | SELVDD output high (3 Volts) if F6ECh bit 4 is low. |
| | 3 | 0 | LCDPWRN signal low (display power and clocks active). |
| | | 1 | LCDPWRN signal high (display power and clocks disabled). |
| | 4 | 0 | SELVDD signal follows the polarity of F6ECh bit 2. |
| | | 1 | SELVDD signal is disabled to high impedance. |
| | 5 | 0 | RWPWRN signal is low (RS-232 driver's charge pump is enabled). |
| | | 1 | RSPWRN signal is high (RS-232 driver's charge pump is disabled). |
| | 6 | 1 | Stop the processor clock. Must have previously been low. |
| | 7 | 1 | Sets BAUDCLKG signal low (disables the 1.8432 MHz crystal circuit). |
| F6ED | 0-1 | 0h | PHCLK/PHCLKN will change every 1 ROWCLK's. |
| | | 1h | PHCLK/PHCLKN will change every 2 ROWCLK's. |
| | | 2h | PHCLK/PHCLKN will change every 4 ROWCLK's. |
| | | 3h | PHCLK/PHCLKN will change every 8 ROWCLK's. |
| | 2 | 1 | Value will be read from 0062h bit 4. |
| | 3 | 1 | Value will be read from 0062h bit 6. |
| | 4 | 1 | Value will be read from 0062h bit 7. |
| | 5-7 | | Reserved. |

FIG. 5E

COMPUTER POWER MANAGEMENT SYSTEM

REFERENCE TO PRIOR APPLICATION

This is a divisional application of U.S. patent application Ser. No. 08/087,249, filed Jul. 1, 1993 (now abandoned) which is itself a divisional application of U.S. patent application Ser. No. 07/436,642, filed Nov. 13, 1989 (now abandoned), which is itself a continuation in part of U.S. patent application Ser. No. 07/373,440 filed Jun. 30, 1989 (now abandoned).

REFERENCE TO MICROFICHE APPENDIX

Appendix A, which is a part of the present disclosure, is a microfiche appendix consisting of 4 sheets of microfiche having a total of 383 frames. Microfiche Appendix A is a listing of computer programs and subroutines which implement a preferred embodiment of the present invention. This microfiche appendix contains material which is subject to copyright protection. The copyright owner does not object to facsimile reproduction of the patent document and appendix in Patent Office files, but reserves all other copyright rights.

BACKGROUND OF THE INVENTION

1. Field of the Invention

This invention relates to a power management device and power management method for a computer. More specifically, the invention relates to both hardware and software for a portable battery powered computer which enables the computer to draw a very small amount of electric power.

2. Description of the Prior Art

Low power hardware and software techniques are well-known in the field of computing. For instance, hand-held calculators that use very small batteries and which can operate for long periods from those batteries are well-known. However, for general purpose computers such as IBM PC compatible computers or similar computers, low power techniques are not well developed. Small computers, i.e., laptop computers which can operate for several hours off fairly large batteries, are well known. However, computers which operate for a long period from small batteries are not known in the art. Specifically, it is not known in the art to provide such an IBM PC compatible computer.

The original IBM PC computers were designed for a conventional desktop computing environment. Such computers were meant to draw power from the wall socket. These computers also typically use electronic circuitry components which consume large amounts of electric power. IBM PC compatible computers also include software (e.g., BIOS) which was not designed to conserve power.

The key elements to IBM PC compatibility are the ROM BIOS (read only memory basic input-output system), the hardware architecture, and the operating system. One operating system for an IBM PC compatible computer is MS-DOS as provided commercially by Microsoft. In order for a computer to be compatible to an IBM PC computer, it is therefore necessary to adhere very closely to the software interface standards of Microsoft and IBM. This has disadvantages for low power computer management software.

The 8086 (IPX86) family of microprocessors from Intel, which includes the 8088 and 80X86 microprocessors, is used in IBM PC-XT compatible computers and includes in its system RAM (random access memory) an interrupt table. The interrupt table lists addresses of software routines to which a computer program is directed in response to an interrupt. The IBM PC compatible ROM BIOS and MS-DOS operating system are controlled through a system of hardware and software interrupts. Hardware interrupts are initiated by providing a signal on one of the processor pins. Software interrupts are initiated when the processor executes a specific class of instructions known as software interrupts. These conventional interrupts include in the prior art an NMI (nonmaskable interrupt) which is not used extensively in the prior art IBM PC compatible computers.

In the prior art, NMI, that is, nonmaskable interrupts, are not really nonmaskable, i.e., always active, because they can be disabled. The software interrupt table in the prior art includes a number of addresses, i.e., memory addresses. An address is provided for each interrupt, which points to the interrupt handler. That is, one address points to a memory location where the interrupt handler is located. Thus for every interrupt there is an entry in memory which contains the interrupt handler entry point.

For application programs that are so-called badly behaved applications programs, the application program may take over any particular interrupt. Thus, instead of a particular interrupt vector table entry pointing to an interrupt handler as intended, the application program causes an interrupt to be revectored, that is, reset, to point to another location. Thus, an application program takes over a particular interrupt by making the particular entry in the vector table point to the application program rather than to the ROM BIOS or operating system. Thus the interrupt which is meant to cause a particular function to be executed is never called because that interrupt vector table entry has been preempted by the application program.

In the prior art the software interrupts include parameters which are passed to particular locations (i.e., registers) in the microprocessor. The interface into the software interrupts in the prior art IBM PC compatible computer is defined in a well-known set of standard published definitions. See for instance *The New Peter Norton Programmer's Guide to the IBM PC & PS/2*, Microsoft Press. Thus, the values held in various microprocessor registers may be replaced by application writers who use this guide, making for programs which are badly behaved.

Application programs which are badly behaved not only preempt ROM BIOS services but they also preempt operating system services. Thus, one cannot rely on conventional operating system and ROM BIOS services to monitor what is occurring in the computer.

Also provided in the conventional IBM PC architecture are two interrupts which are relevant to computer keyboard events. Interrupt INT9 is conventionally generated by the small microprocessor which is typically provided to control an IBM PC compatible computer keyboard. Thus, Interrupt INT9 causes information from the keyboard to be put into a buffer. Interrupt INT16h (h for hexadecimal numbering) accesses this information from the buffer and provides it to the program which invoked the software interrupt instruction. Interrupt INT16h is therefore a software interrupt which is invoked typically by application software and/or MS-DOS to make a request to the keyboard services software to show status of certain registers such as waiting for a key to be pressed.

For instance, one event which consumes major time in a computer program is waiting for a key press on the keyboard of the computer. For a typical application program running on a computer such as a spreadsheet or word processing program, if the computer application program is well-behaved (as described below) the computer program could simply issue a request to MS-DOS to wait for the next key. MS-DOS could in turn simply issue a request to the ROM BIOS to wait for a key press. The ROM BIOS would then simply loop until it detected a key press.

MS-DOS does not use this procedure. Looping until a key press is detected means the application program can not concurrently perform other functions. Instead MS-DOS uses a procedure which can be alternated with other procedures. MS-DOS asks the ROM BIOS in the computer if a key has been pressed. The ROM BIOS includes a buffer for storing keystrokes as the keys are pressed. MS-DOS loops in this operation of periodically examining this buffer (with other MS-DOS processing going on in other parts of the loop). The ROM BIOS cannot simply shut off the first time this buffer is examined because this would interrupt other MS-DOS processing and therefore hang up the machine making it inoperable.

In fact many MS-DOS applications programs are badly behaved in that they take over the BIOS and MS-DOS functions called through the use of software interrupts by revectoring the interrupt to the application program. Thus, calls to BIOS provided for by MS-DOS may never be carried out.

Thus in the conventional IBM PC compatible computer, it is inherently difficult to perform any software power management in response to particular MS-DOS or BIOS operations being carried out by an application program. That is, if the ROM BIOS interrupt handling routines are not called, then the conventional MS-DOS operating system includes no means of implementing power savings techniques in response to loop operations such as looking for key presses. This means that IBM PC compatible computers are not generally available for use in systems which use small batteries unless the batteries are to be replaced or recharged frequently (i.e., after four or five hours).

Generally the hardware, that is the electronics circuitry, in an IBM PC compatible computer is not typically conserving of electric power either. That is, the computer circuitry typically operates, i.e., draws power, even when it is not actually in use. This further contributes to high power consumption by such a computer.

The above disadvantages of IBM PC compatible computers also apply in many respects to non-IBM PC compatible computers such as computers sold by Apple or other companies which are not necessarily IBM PC compatible. Likewise, the problem of bypassing MS-DOS commands exists for bypassing commands in other operating systems such as Unix and OS/2 for example (Unix is a registered trademark of American Telephone and Telegraph Company and OS/2 is a registered trademark of International Business Machines Corporation). Again, these other computers were designed for use in a desktop environment where power is provided readily from a wall socket. Therefore in general, typical personal computers do not have power conservation features as a basic element.

SUMMARY OF THE INVENTION

In accordance with the invention, a power management system device and method are provided for a computer. In accordance with the invention, the computer operates in various modes. In each of the modes, particular hardware elements of the computer are disabled. These elements are enabled as needed. The modes are controlled by both the computer hardware and software so that to the user the computer appears to be functioning as if all of the hardware elements were enabled at all times. Thus the operation of the computer in terms of the power management system requires no modification of applications software and is generally transparent to the user.

In the preferred embodiment the computer is compatible to the IBM PC-XT computer and has an 80C88 microprocessor as the central processing unit. In the preferred embodiment the computer is powered by two small batteries. The computer operates many hours from these batteries.

In accordance with the preferred embodiment of the invention, the power management system of the computer includes a number of features. In order to conserve power and extend the battery life of the computer, the computer circuitry is partitioned into sections preferably based on the need for clock signals of particular frequencies. The sections are partitioned according to the particular timing signal (i.e., clock) frequencies that are required to operate each section. The sections are also partitioned based on those which require constant clock signal input versus those which only require clock signals during certain modes of operation. When there is no demand for a given clock frequency (as typically generated by an oscillator), the oscillator is preferably disabled to conserve power. The main system clock is stopped when a control program determines that software currently being processed by a microprocessor is in an idle state. An idle state exists when the main system clock which runs the microprocessor can be stopped without delaying output to a user of the computer and the program.

The computer in accordance with the invention is provided with an enable feature for the starting and stopping of the main system clock (i.e., timing signal generator). Also included is a state controller to ensure orderly starting and stopping of the main system clock. The state controller manages the oscillator which provides the main system clock signal, thus ensuring that start and stop requests are fulfilled without allowing any imperfect clock pulse, i.e., a "glitch," to reach any logic circuitry.

The state controller stops the main system oscillator upon receipt of a so-called sleep request signal. This request signal comes from a bit in a particular register accessible to the microprocessor of the computer. When this bit is set, the microprocessor "clock" is stopped on the next falling edge of the main system clock signal.

The state controller will also stop the main system oscillator in a similar fashion when the state controller detects a request to inject an external processor clock signal (such as from a computer peripheral device). This stops the internal main system clock in a "glitch free" fashion, i.e., no imperfect clock signals are generated. The external clock source is synchronized with a slower clock source, then gated through to the microprocessor of the computer and other logic in the computer.

The microprocessor clock is preferably stopped in the middle of an input/output write instruction, which ensures that all the microprocessor address, data, and control signal lines are in a known state when the microprocessor clock is stopped. This prevents inputs to the microprocessor and other circuitry from oscillating unnecessarily, without any need for provision of external pull-down or pull-up resistors. The elimination of these resistors is desirable because they undesirably consume power.

The state controller will preferably start the main system clock oscillator and, after allowing sufficient time for the main system clock oscillator to stabilize, will synchronize it with a slower clock and gate the clock to the microprocessor when a wake-up request is received by the state controller.

Wake-up requests may come in the form of a timer interrupt, a keyboard interrupt, a UART (universal asynchronous receiver transmitter) interrupt or any event which generates a nonmaskable interrupt (NMI). A request to switch from the external processor clock source back to the internal main system clock is also handled in this manner. The wake-up requests are all maskable by manipulating the appropriate bits in a particular register accessible to the microprocessor.

In addition, a DMA (direct memory access) controller clock timing signal is also derived from the main system clock signal. Circuits are provided to gate the main system clock to the DMA circuits as needed, including during DMA cycles, system reset, and any input/output operations of DMA control registers.

In accordance with the preferred embodiment of the invention, other clock signals are provided to the UART, which provides serial communications to and from the computer. Another clock signal is provided for the computer display, in order to provide signals for the circuitry which is used to refresh the video display of the computer. Also, a low frequency clock signal is provided which is used in various parts of the computer system.

In accordance with the preferred embodiment of the invention, the microprocessor may be stopped between successive keypresses on the keyboard. The microprocessor is stopped after unique software determines that the application program has responded to the previous keypress and is not performing a computation but is merely waiting for another keypress. The microprocessor is started again in response to the next keypress. Stopping is accomplished preferably by means of software as described in more detail below. Stopping the microprocessor (i.e., not clocking the device) saves power. When the microprocessor is running (i.e., receiving clock signals), power is consumed by the processor itself as well as the memory provided in the system. The processor consumes power when it is receiving clock signals because these clock signals cause electrical elements within the device to switch. These elements consume much more power when switching than when they are static. Additionally, memory devices consume more power when they are read from or written to than when they are idle and not being selected.

The preferred embodiment of the invention includes software which can save power even with so-called badly behaved application software programs. As described above, these badly behaved programs seize control of the hardware, BIOS, and operating system interrupts in contravention to the usual conventions.

In accordance with the preferred embodiment of the invention, circuitry in the computer triggers software events through the use of nonmaskable interrupts (NMIs). The NMI is used as a matter of convenience; in other embodiments, other interrupts are used, or other means of interrupting instruction flow such as a bus controller altering instruction provided to the microprocessor. In accordance with a preferred embodiment of the invention, substantial use is made of the NMI, which is conventionally provided in the computer but typically not extensively used in IBM PC-XT compatible computers. The NMI is used in accordance with the preferred embodiment of the invention because it has a higher priority than most of the other interrupts. Thus a common entry point is provided for the hardware to signal to the software that any one of a number of events could have occurred.

Also provided in one embodiment of the invention is a trap which detects when the microprocessor will be sent a particular interrupt. Provision of this trap means that novel hardware and software can now have control over what is happening in the computer in spite of badly behaved applications programs. This is because the novel system software detects particular hardware and software events, that is, particular interrupts generated by hardware (for example, key presses or communication bits coming to a communications port) or software (for example, an application program looking for key presses or communication bits).

Thus, in accordance with the invention, before an interrupt generated by an applications program or by external hardware is allowed to cause processing, instead the BIOS itself may assume control and engage in preprocessing activity. In the preferred embodiment of the invention this preprocessing activity allows the BIOS to determine if the computer should go into a low power consumption mode.

The invention thus has the advantage of providing a portable computer which draws extremely low amounts of electric power. The computer is compatible with IBM PC-XT application programs and executes such programs without any need to modify the program. In the preferred embodiment of the invention, this advantage is provided by means of particular hardware and software.

A general description of the computer in the preferred embodiment, is in commonly assigned U.S. patent application Ser. No. 07/375,721, now abandoned, entitled Portable Low Power Computer, attorney docket no. M-968, incorporated herein by reference.

BRIEF DESCRIPTION OF THE DRAWINGS

FIGS. 5A to 5E show a port map in accordance with the invention.

Identical reference numbers in various figures denote identical or similar structures.

DETAILED DESCRIPTION OF THE INVENTION

Description of the Power Mode State Diagram

Figure 1:
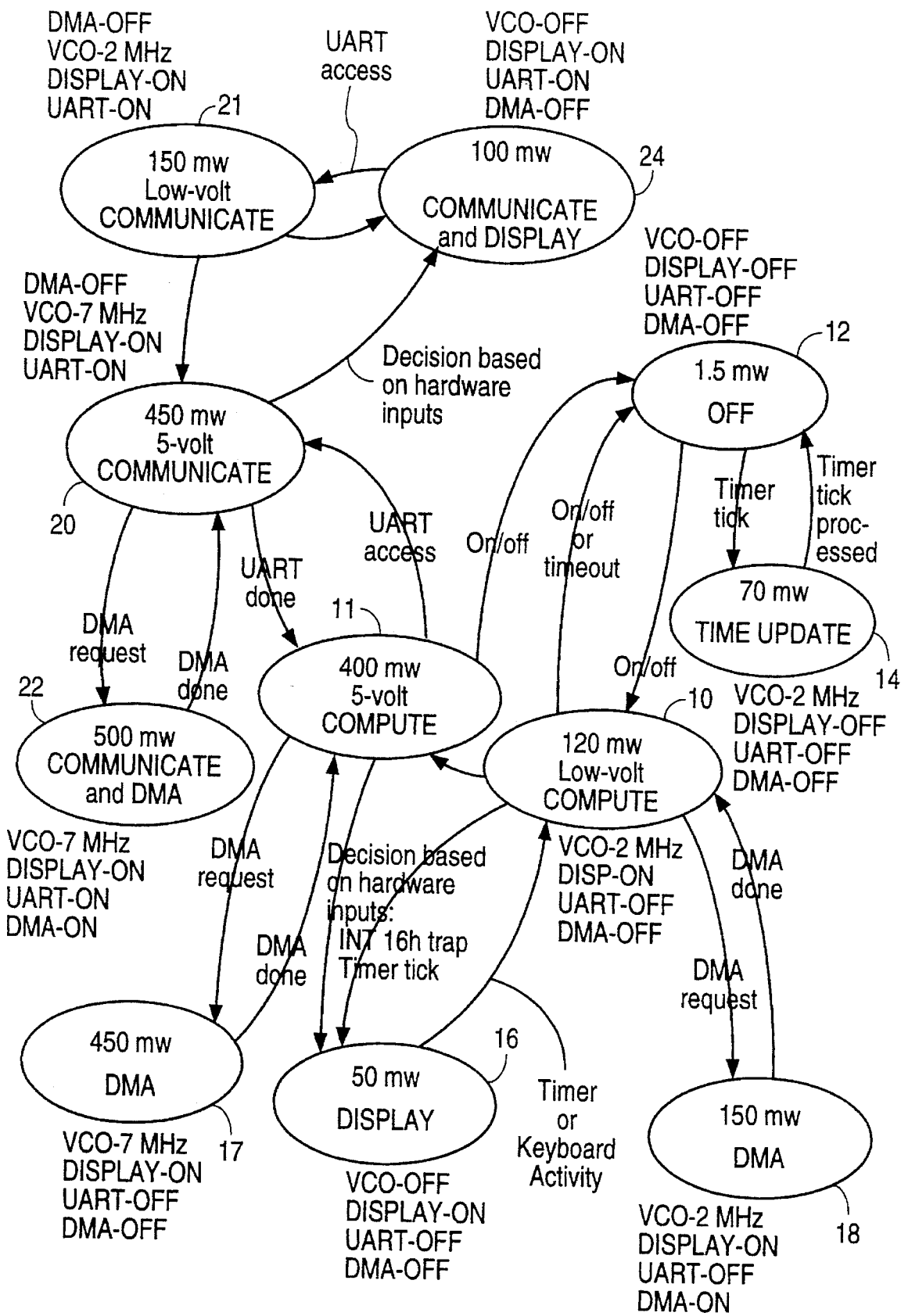
FIG. 1 shows a state diagram of power modes in accordance with the preferred embodiments of the invention.

FIG. 1 shows a state diagram of the power modes provided in the preferred embodiment of the invention. Two compute modes 10 and 11 are shown in the center portion of the figure. In low-volt compute mode 10, the computer draws about 120 milliwatts of power, shown in FIG. 1 as "120 mw". This and other numerical specifications presented herein are illustrative estimates and not critical to the invention. In compute mode 10, the VCO (i.e. the voltage controlled oscillator, not shown) which provides the main system clock signal is on. The video display (not shown) of the computer, i.e. the computer screen, is also on. The UART (not shown) and the DMA clock (not shown) are off, that is, not being clocked. The VCO is powered at a low voltage, in the range of 2 to 3 volts, and thus provides a low clock speed, on the order of 2 MHz, to the microprocessor. For many activities, for example responding to data entry during word processing, a low clock speed responds to the user as well as a higher clock speed responds, and consumes considerably lower power.

If a user makes demands on the computer for considerable processing, it is desirable to use a higher clock speed. Therefore if the computer has remained in compute mode 10 for longer than a specified time, currently preferred at 1.5 seconds, the computer moves to a higher voltage 5-volt compute mode 11, in which the VCO operates at about 7 MHz. As in compute mode 10, the video display is on, the UART is off and the DMA clock is off. Processing is completed at a faster rate in compute mode 11.

All other states are accessible directly or indirectly from one of these compute modes. The computer passes from compute modes 10 to off mode 12 under two conditions. The first condition is when the on/off switch (not shown) of the computer is switched. The second condition is a "timeout" condition. The timeout means that there has been no activity, i.e. computation or keyboard activity for a relatively long time. This time is preferably several minutes and is preferably programmable, as described below. The computer can be changed from compute mode 11 to off mode 12 in the presence of heavy processing by pressing the on/off switch. Upon again pressing the on/off switch, the computer will return to the same point in the processing.

In the off mode 12, the computer draws about 1.5 milliwatts of power. In the off mode 12, the VCO is off, the display is off, the UART is off, and the DMA is off. But the computer is not truly off because it can respond to pressing of the on/off switch and returns to compute mode 10 at the same point in a program which was being executed when the computer was turned off. The computer passes from off mode 12 to compute mode 10 when the on/off switch is switched by the user.

The time update mode 14 is reached only from the off mode 12. However, the time of day is maintained in all of the various modes of the system. In the off mode, periodically when a timer tick (derived from a low frequency clock as described below) is provided by the timer circuitry (not shown) in accordance with the invention, the computer passes from the off mode 12 to the time update mode 14. In the time update mode 14 the computer draws approximately 70 milliwatts of power. The computer is only in the time update mode 14 for a very brief time, long enough to update the time keeping functions of the computer. In the time update mode 14 the display, UART, and DMA are all off.

The time of day is updated by the timer which is derived from a low frequency clock as described below. When the update of the time of day has been completed the computer passes from the time update mode 14 back to the off mode 12.

The computer passes from the compute mode 10 to the display mode 16 based upon the occurrence of particular hardware inputs. These hardware inputs, as described below, include: the interrupt INT16h trap, keyboard activity, i.e., the user typing on the keyboard, and timer ticks. These inputs are used to determine if the operating system or applications program is in an idle state and therefore waiting for user input. If it is determined that the program is waiting for user input, the computer passes from compute mode 10 to display mode 16. In the display mode 16, the computer draws approximately 50 milliwatts of power. Thus when the computer is in the display mode 16 the microprocessor itself is not running (i.e., not being clocked). These same events can move the computer from 5-volt compute mode 11 to display mode 16. The computer passes from display mode 16 to compute mode 10 as a result of a keyboard activity (i.e., the user presses a key) or a timer tick. The computer, when in use, frequently passes from compute mode 10 to display mode 16 in order to conserve the relatively large amount of power used in compute mode 10. Thus most of the time when the computer is used it is in display mode 16, and the microprocessor is not running even though the display is on. In the display mode 16 the VCO is off, the display is on, the UART is off, and the DMA is off.

The computer also passes from the compute mode 10 to and from the DMA (direct memory access) mode 18. In DMA mode 18 the computer draws approximately 150 milliwatts of power. The computer passes from compute mode 10 to DMA mode 18 upon receipt of a DMA request. When the DMA processing is completed the computer passes from DMA mode 18 back to compute mode 10. In DMA mode 18 the VCO is on and operating at approximately 2 MHz, the display is on, the UART is off, and the DMA clock is on.

Similarly from compute mode 11, the computer passes to DMA mode 17. In DMA mode 17, the VCO is on and operating at approximately 7 MHz, the display is on, the UART is off, and the DMA clock is on. In DMA mode 17, the computer draws approximately 450 milliwatts of power, the higher power being a result of the higher voltage of the system power supply and the higher switching speed resulting from the higher VCO speed.

The computer also passes from compute mode 10 to and from communications mode 20. For simplicity, these paths are not shown in FIG. 1. As is shown, the computer also passes from compute mode 11 to and from communicate mode 20 in response to a request to access the UART, and completion of the UART access, respectively.

When the computer first enters communicate mode 20, the voltage is at the higher level, causing the VCO to operate at the 7 MHz speed. Upon detection of a loop activity (explained more fully later), the computer may be programmed to move to communicate and display mode 24, in which the VCO is turned off, thereby saving power. Communicate and display mode 24 uses only 100 milliwatts of power. In one embodiment this is the mode occupied by the computer the majority of the time a user is sending or receiving a file by modem. The computer passes from communicate mode 20 to communicate and display mode 24 upon similar conditions for which it moves from compute mode 10 or 11 to display mode 16.

From communicate and display mode 24, a request to access the UART causes the computer to move to low voltage communicate mode 21, in which the VCO is turned on but operates under the low voltage, at approximately 2 MHz. In communicate mode 21 the UART and display are turned on. If there is a stream of bits which lasts longer than a specified time, on the order of 50 milliseconds to a few seconds, the computer moves to 5 volt communicate mode 20. Otherwise, upon completion of the UART access, the computer returns to communicate and display mode 24.

The computer reaches the communicate and DMA mode 22 only from the communication mode 20. In the communicate and DMA mode 22 the computer draws approximately 500 milliwatts of power. The computer passes from the communicate mode 20 to the communicate and DMA mode 22 upon receipt of a DMA request when in communicate mode 20. When the DMA request is done the computer passes back to communicate mode 20. In the communicate and DMA mode 22 the VCO is on, the display is on, the UART is on and the DMA is on.

Description of Sectional Power Control on Demand

Figure 2:
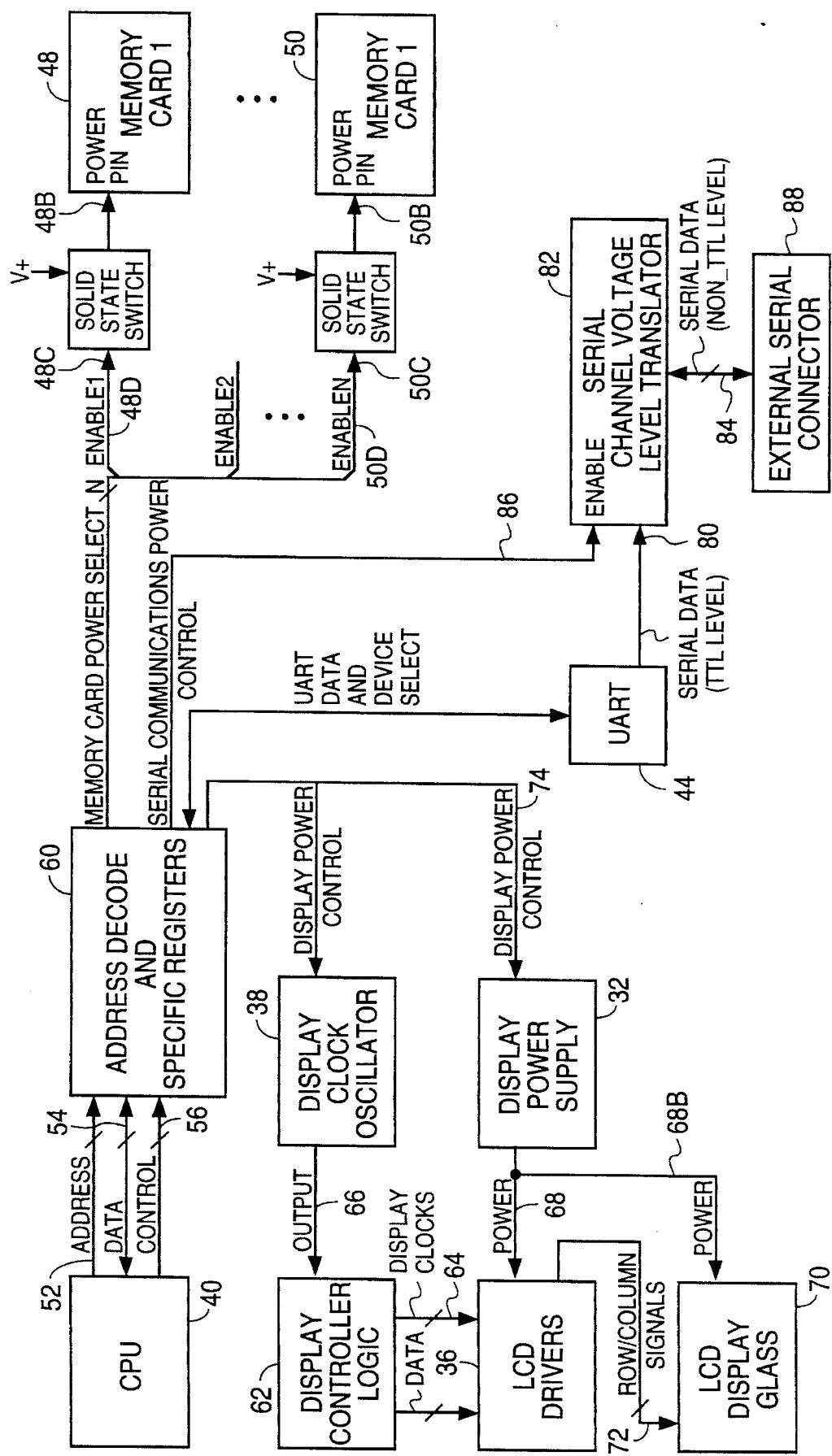
FIG. 2 shows in block diagram form the sectional power management circuitry in accordance with the invention.

In accordance with the invention, a feature called sectional power control on demand is provided. This feature provides that each section of the computer may be powered up only as needed. The sections are powered up accordance with the state diagram as shown in FIG. 1. FIG. 2 shows in block diagram form the circuitry associated in the preferred embodiment of the invention with the sectional power control on demand feature. The object of this feature is to isolate portions of the computer circuitry (i.e., hardware) which can be powered independently. Thus power is applied only to each section when needed, leaving each section powered down (i.e., turned off) when it is not needed. Powering down sections of the computer when inactive increases the life of the batteries.

In one preferred embodiment, three portions of the computer, the display, the communication channels and the CPU, have independent controls allowing them to be powered up or clocked as needed. In the preferred embodiment of the invention, both hardware and software together determine electric power demand and manage these independent controls.

First, for the display, the power supply circuit 32 as shown in FIG. 2 can be turned off. Also, the LCD driver chips 36 which drive the actual display 70 can be disabled. The clock oscillator 38 for the display can be disabled. The software performs the above functions by controlling a bit in a particular register F6EC<bit 3> accessible to the microprocessor 40 in the computer (see port map, FIG. 5E). Second, for the serial communications portion of the computer, the power supply circuits (not shown) can be disabled by register F6EC<bit 5>. Also the oscillator (not shown) which generates a timing signal for the UART 44 can be disabled by register F6EC<bit 7> (see port map, FIG. 5E). Third, the clock for controlling CPU 40 can be turned off, as discussed above, thereby not switching transistors which respond to the software being executed if the software is in an idle loop.

An alternative embodiment includes at least one memory card 48, 50 which provides the nonvolatile memory. A power pin 48B, 50B of each memory card 48, 50 is controlled, allowing a computer power supply (not shown) to provide power to memory chips (not shown) which are internal to each memory card 48, 50. A fourth portion of the computer comprising the memory cards may also be powered up only as needed. Two memory cards 48, 50 are shown; others may be provided. The power to each memory card 48, 50 is turned off by a solid state switch 48C, 50C. The switches 48C, 50C, one of which is provided for each memory card 48, 50 are controlled automatically based on an address decode, or are controlled by a bit in a particular register accessible to the microprocessor 40. The memory cards 48, 50 as used in the preferred embodiment of the invention are described in commonly assigned U.S. patent application Ser. No. 07/374,691, now abandoned entitled A Method and Apparatus for Information Management in a Computer System, attorney docket No. M-951, incorporated herein by reference.

As shown in FIG. 2, the CPU 40 (i.e., the central processing unit or processor, preferably a microprocessor), is connected to address lines 52, data lines 54, and control lines 56 which carry signals for decoding valid addresses. The microprocessor 40 is connected by these lines 52, 54, 56 to the address decode logic and specific registers circuitry 60. The circuitry 60 as shown includes all the logic needed to decode addresses in the microprocessor 40. Some addresses cause enable and select signals during a microprocessor instruction processing cycle. Other addresses correspond to specific ports accessible to the microprocessor 40 (see port map, FIG. 5). When a specific port address is decoded along with an instruction to perform an input/output write, then the microprocessor data is latched into a register, which is referred to as a specific register. If the operation is a read operation, then this logic circuitry 60 gates the appropriate data onto the microprocessor bus, i.e., the data line 54 to the microprocessor 40.

Display Power Management

The display controller logic circuitry 62 includes all the logic which allows the computer to emulate the conventional IBM PC computer compatible display standards known as MDA and CGA described in *The New Peter Norton Programmer's Guide to the IBM PC & PS/2*. This circuitry 62 also generates the clock timing signals 64 needed by the display LCD driver circuitry 36 from the display clock signal 66 provided by the oscillator 38 for the display clock. The oscillator 38 for the display clock is the actual oscillator which generates the timing for the display clock signal 64. The power control signal 68 for the display 70 enables the oscillator 38 for the display clock signals 64.

The LCD drivers 36 are the driver circuits which demultiplex the data from the display controller logic circuitry 62 and present the row and column data 72 to the LCD display glass 70. The LCD display glass 70 is the actual LCD physical display which the user of the computer views. The LCD drivers 36 are powered by the display power supply 32. See commonly assigned U.S. patent application Ser. No. 07/374,340, which is now U.S. Pat. No. 5,130,703, entitled Power System and Scan Method for Liquid Crystal Display, invented by John Fairbanks, Andy E. Yuan, and Lance T. Klinger, attorney docket no. M-806, incorporated herein by reference. The display power supply 32 is a switching power supply which generates all the necessary voltage levels to drive the LCD display glass 70. The display power supply 32 is controlled by a display power control signal 74 provided from the address decode logic and specific registers circuitry 60. The display power control signal 74 thus turns off the display power supply 32 when the display is not in use. The LCD display glass 70 receives demultiplexed row and column data 72 from the LCD drivers 36, and obtains its power 68B from the display power supply 32.

Communication Power Management

The UART 44 produces TTL (transistor-transistor logic) voltage level signals 80 which are translated so as to conform to conventional communications standards such as RS-232-C. The UART 44 also requires that incoming data be translated back to TTL voltage levels. The serial channel voltage level translator circuitry 82 accomplishes this function. The serial channel voltage level translator 82 translates voltage levels between those of one of the conventional communications standards 84 as described above and TTL voltage levels 80. The non-TTL voltage levels 80 are generated by the serial channel voltage level translator circuitry 82 using switching techniques as is conventional. The power supply of translator 82 will operate only when enabled by the serial communications power control signal 86, which is preferably under software control as a specific register bit F6EC<7 bit> (see port map, FIG. 5E).

The external serial connector 88 is a connector preferably located externally to the case of the computer. This connector 88 connects serial devices to the computer. All signals 84 at this connector are non-TTL and require translation of voltage levels before reaching the UART 44.

Memory Card Power Management

In one embodiment, a solid state switch 48C, 50C controls the power pin 48B, 50B of each of the memory cards 48, 50 as described above. An enable signal 48D, 50D, derived from decoding of memory addresses by the address decode and specific register circuitry 60, or by a bit in a specific register (see port map, FIG. 5D) controls the solid state switches 48C, 50C. The enable signal 48D, 50D turns power on to a memory card 48, 50 only when that particular memory card is to be accessed.

The above described circuitry is controlled by a control program executed by the microprocessor 40, i.e., the CPU. This control program is preferably an assembly language microprocessor program. Further details of the operation of this control program as it pertains to power management are provided below. Hereinafter follows a brief description of the operation of this control program.

With regard to the display power supply 32, the control program detects either a user request to turn the computer off (by means of an on/off switch) (not shown) or detects inactivity (i.e., an idle state) of the computer over a period of time. A particular bit is changed in a specific register accessible to the microprocessor 40 turning off the display related circuitry register F6EC<bit 3> (see port map, FIG. 5E). The control program detects either a user request to turn the system on (by means of the ON/OFF switch) or a programmed event which is to turn the system on.

With regard to the serial communications power supply software, usage of the UART 44 is detected either by a service request to the control program or by an interrupt, as described below. A particular bit is changed in a specific register F6EC<bit 5> accessible to the microprocessor 40 turning on the circuitry related to communications (see port map, FIG. 5E). The termination of communications services by the user of the computer is detected either by a request to the control program or by detecting a lack of communications activity. A particular bit is changed in a specific register F6EC<bit 7> accessible to the microprocessor 40 turning off the hardware circuitry relating to communications (see port map, FIG. 5E).

For the memory card power supply, memory card 48, 50 access by the computer is detected either by a service request to the control program or automatically through address decoding. If the automatic mode is not in use, then a particular bit is changed in a specific register accessible to the microprocessor 40 thus turning on power to the memory card 48, 50 for the duration of the access to the memory card.

Figure 3:
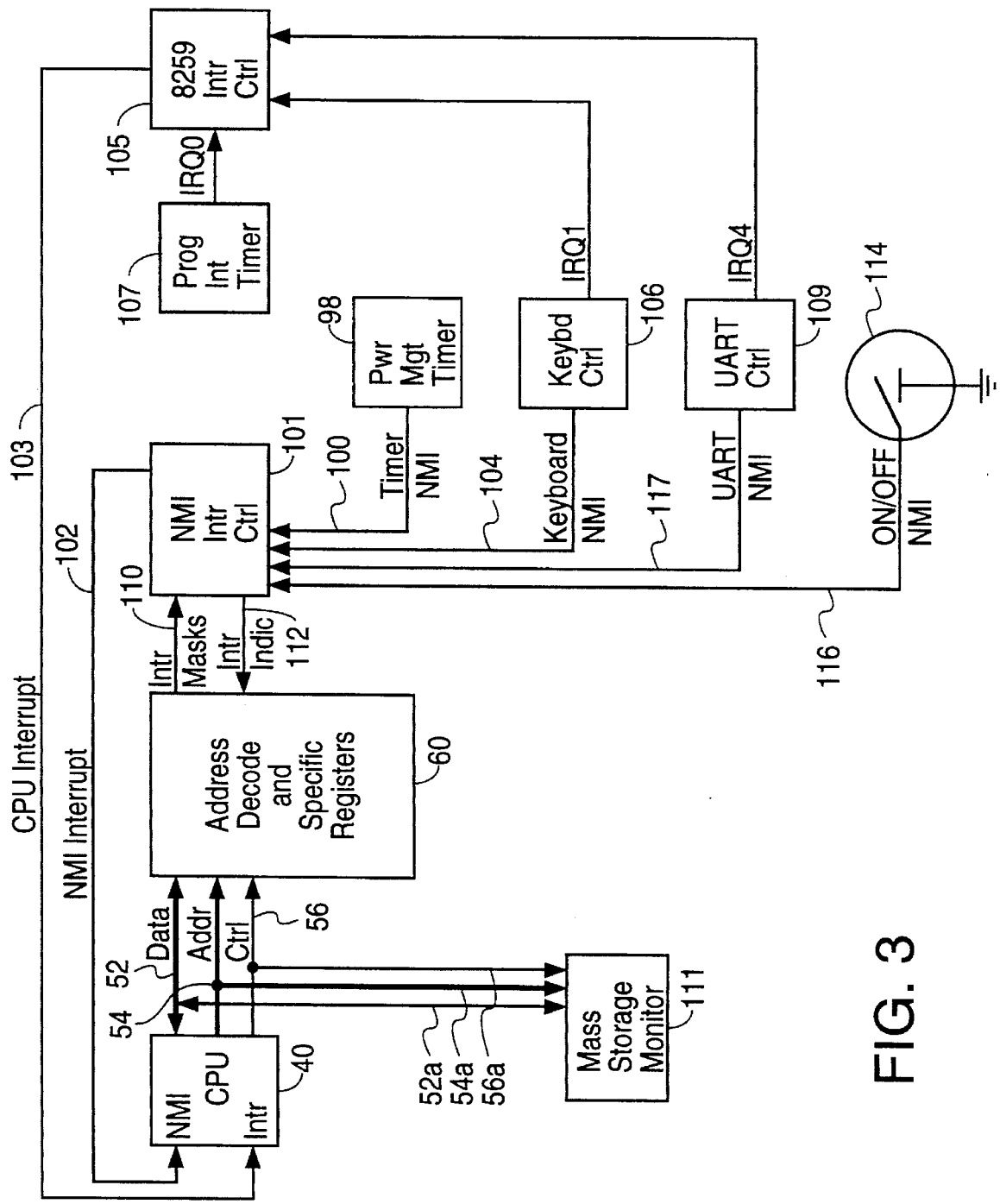
FIG. 3 shows in block diagram form circuitry in accordance with the invention.
Figure 4:
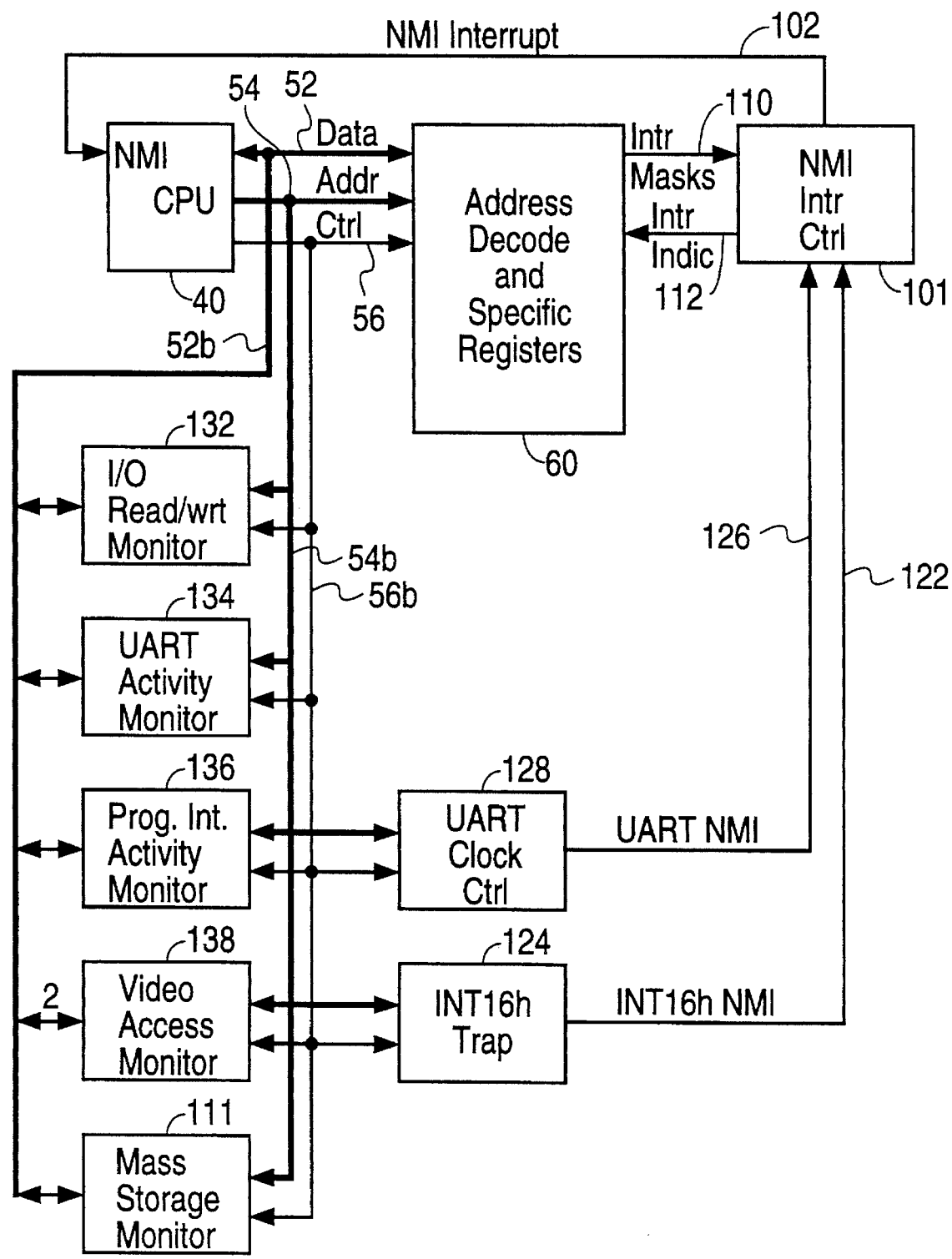
FIG. 4 shows in block diagram form further circuitry in accordance with the invention.

Schematic diagrams for the circuitry described in this patent disclosure are included in commonly assigned U.S. patent application Ser. No. 07/375,721, now abandoned, attorney docket no. M-968, entitled Portable Low Power Computer, incorporated herein by reference. Flow charts for the power management related events are shown here in FIGS. 3 and 4. FIG. 3 shows hardware events which cause the microprocessor clock to turn on or off and FIG. 4 shows software events which cause the microprocessor clock to turn off or prevent turning off the microprocessor clock.

Description of the Hardware Activity Circuitry

In the preferred embodiment of the invention, in order to conserve power and extend the battery life of the computer, the hardware of the computer, i.e., the circuitry, as described above is partitioned into sections based on the need for clock signals. The oscillators which provide the clock signals to different portions of the computer are enabled and disabled based upon the demand for their services. Disabling an oscillator when it is not needed conserves power. In accordance with the invention, those oscillators which are dormant, i.e., disabled at a particular time, are started in a fashion so as to be glitch free, that is to provide clock signals only when stable. Disabling an oscillator when it is not needed thus conserves power. Since the oscillators take a period of time after being turned on to stabilize, circuits are provided to start the oscillator, then wait an appropriate amount of time before allowing the oscillator signal to reach any of the logic circuitry which it drives. For the oscillator which generates the timing signal for the microprocessor clock, a voltage controlled oscillator is provided having a frequency which is a function of the system power supply output voltage. Thus since the power supply voltage is under software control, the microprocessor clock frequency is also under software control.

Detecting whether the computer is in an idle state is important when determining if it is appropriate to stop the clock signal to the microprocessor. The computer processor 40 is in an idle state when it is not acting upon user generated input. In order for the control program in the microprocessor to differentiate between an idle state and an active state, the microprocessor control program must have knowledge of hardware activity. Circuitry is provided in accordance with the invention to monitor the computer circuitry (see FIG. 2) and alert the control program by way of an interrupt when particular hardware events occur.

In one preferred embodiment of the invention, four hardware events are monitored by the control program and appear to the control program as nonmaskable interrupts (NMIs). These four hardware events are the system timer tick, keyboard activity, communications port activity, and on/off switch activity.

FIG. 3 shows a block diagram of hardware events monitored by the power management control program of the present invention.

As in conventional MS-DOS compatible computers, programmable interval timer 107 is provided for generating timing signals for which the interval can be programmed. According to the present invention, a second timer 98 is provided for use by the power management system of the present invention which can be programmed to generate a timer tick 100 at predetermined intervals. The timer tick 100 is used as a time reference and a watchdog timer. The timer tick 100 provides periodic ticks 100 which are treated by the BIOS as nonmaskable interrupts (NMIs) which are used by the BIOS (basic input output system) control program in maintaining control of the system despite badly behaved application programs, such as word processing or spread sheets, running on the computer.

The presence of keyboard activity causes most keystrokes to be stored in a buffer until acted upon by the software. Typically the application program cycles periodically through a loop which includes looking for keyboard activity (looking for entries in the keyboard buffer). For example, if an application program is loading a large file onto disk or other mass storage memory, the program may also periodically look for pressing of certain keys so that the user has the opportunity to stop the operation of writing to memory before the operation is complete. Such opportunities for the user to interrupt the program while it is performing other functions are commonly provided in application programs. At other points in a program, there may be no other functions happening except that the program is waiting for a keystroke.

Since the microprocessor speed is typically much greater than the typing speed of the user of the computer, it is desirable to conserve power by stopping (i.e., not clocking) the microprocessor between keystrokes when the user is typing and the program is performing no other function except processing the response to the typing, which typically occurs in a small part of the time between keystrokes. In this situation, the software is in an idle state, that is, the microprocessor can be stopped without delaying the computer's response to a user. In order for the computer to stop and restart the microprocessor, the computer must include hardware to restart the microprocessor in response to an external event. The microprocessor goes into the compute mode as described above, as a result of a keypress.

Note that in the preferred embodiment of the invention the so-called power on/off switch 114 does not actually turn power on and off but merely provides information to the control system. Since the computer itself is always powered, there is preferably no conventional power switch. Instead the computer is provided with a switch which the user uses to toggle between the off and on states. In the off state the display is off, keystrokes are ignored, the processor is stopped and timer ticks occur at long (i.e., about one minute) intervals. However the computer itself is not truly off. An NMI can be generated when the on/off switch is switched off so that the control program will know that the user wishes to toggle the computer from the off to the on state. Pressing the on/off switch when the computer is switched off causes the computer to move to the compute mode.

As shown in FIG. 3 in block diagram form, the circuitry of the preferred embodiment of the invention operates as follows. A nonmaskable timer interrupt 100 (NMI) is provided by a low frequency oscillator connected to timer 98 which is always running (as long as the batteries are installed). The frequency of the low frequency oscillator is divided down and can generate interrupts either every 54.9 milliseconds or approximately every minute. The choice of the interrupt timing interval is programmable. An interrupt timing interval shorter than 54.9 milliseconds allows faster cutoff of the microprocessor clock in response to an idle state, with a consequent saving of power. However, the interval should be long enough that multiple events indicating idle activity can be observed within a single interval.

Two interrupts can be generated as a result of this divided frequency. The first interrupt is designated IRQ0, and is compatible with the standard IBM PC timer interrupt which is connected as the highest priority interrupt (IRQ0) on an 8259-compatible interrupt controller. As shown in FIG. 3, a standard IBM compatible programmable interval timer 107 generates this IRQ0 interrupt, which is sent to 8259 interrupt controller 105, which in turn sends interrupt 103 to the interrupt port of CPU 40. This interrupt is maskable and compatible to that in the conventional IBM PC-XT computer and is used by programmers to implement such functions as updating the time-of-day clock and initiating any software activities which are programmed to respond to the timer tick. The second interrupt is a power management timer interrupt 100. Although this interrupt 100 can be generated from more than the same timer 107 as used to generate the IBM PC compatible interrupt IRQ0, the preferred embodiment uses a second power management timer 98 to generate interrupt 100. This provision of a second timer allows the timer interval of timer 98 to be varied by the control program of the present invention while the interval of IBM compatible timer 107 is varied by programmers of IBM and DOS compatible computer programs.

This timer interrupt 100 is read by NMI interrupt controller 101 as a nonmaskable interrupt. NMI interrupt controller responds to interrupt 100 by sending a nonmaskable interrupt 102 to the NMI port of CPU 40. This interrupt 102 takes priority over the 8259-compatible interrupt. This interrupt 102 has an indicator bit in a particular register F6E7<bit 6> accessible to the microprocessor 40 to allow software to determine that a timer 100 interrupt was the cause of the nonmaskable interrupt 102 (see port map, FIG. 5C). The timer interrupt 100 can be programmed to automatically start the clock (not shown) to the microprocessor 40.

Another type of interrupt is the keyboard interrupt. When the keyboard circuits are enabled and scanning the keyboard, a signal is generated by keyboard control circuitry 106 any time that a key is pressed, released, or pressed long enough for an antomatic repeat. Two interrupts are generated when keyboard activity is detected. The first interrupt is designated IRQ1. This is the conventional IBM PC-XT keyboard interrupt which is connected in a conventional IBM PC-XT computer as the second highest priority interrupt (IRQ1) on the 8259 interrupt controller. As shown in the embodiment of FIG. 3, the IRQ1 interrupt generated by keyboard control circuitry 106 is provided to 8259-compatible interrupt controller 105, This interrupt is maskable by the 8259-compatible interrupt controller 105 in response to a masking signal (not shown) equivalent to interrupt masks 110 and is IBM PC-XT compatible. If enabled, interrupt IRQ1 causes interrupt controller 105 to send an interrupt 103 to CPU 40.

The second interrupt is the keyboard NMI interrupt 104. It is necessary to provide a separate interrupt to interrupt controller 101 which does not pass through CPU 40 so that keyboard activity can be detected when CPU 40 is not being clocked, so that the clock to CPU 40 can be turned on in response to a key press. Further, certain keys are provided for which the IRQ1 interrupt is not responded to. For example, a key combination for controlling screen brightness generates a keyboard interrupt 104 which causes NMI interrupt controller 102 to turn on CPU 40. But this particular key combination when read by CPU 40 initiates other hardware activity for controlling screen brightness and does not cause 8259 compatible interrupt controller 105 to generate an interrupt 103 to CPU 40. Interrupt controller 101 responds to a keyboard NMI interrupt 104 by generating an NMI 102. This interrupt 102 takes priority over the 8259-compatible interrupts 103 and places an indicator bit in a particular register (F6E7<bit 7>) accessible to microprocessor 40 to allow software to determine that a keyboard interrupt 104 was the cause of the NMI (see port map, FIG. 5D). The keyboard interrupt 104 can be programmed to automatically start the clock to the microprocessor 40.

In the embodiment of FIG. 3, power management can also respond to activity on the communications port of the computer. UART controller 109 In response to activity on the communications port, in addition to generating IBM compatible interrupt signal IRQ4, which causes 8259-compatible interrupt controller 105 to generate CPU 40 interrupt 103, UART controller 109 generates a UART NMI 117, which causes NMI interrupt controller 101 to generate NMI interrupt 102 which restarts the clock to CPU 40. This ability to restart the CPU clock in response to UART activity allows the CPU clock to be turned off between bytes of information coming to or from the external port of the computer.

The on/off switch 114 when pressed generates an NMI 116. An indicator 112 is provided in a particular register F6EA<bit 0> accessible to the microprocessor 40 to indicate that the on/off switch 114 was the cause of an NMI (see port map, FIG. 5D). An indicator 112 is also provided in a particular register accessible to the microprocessor 40 to indicate the current state of the on/off switch 114. The on/off switch interrupt 116 can be programmed to automatically start the processor 40 clock.

The above described circuitry operates with the following software features. As shown in FIG. 3, timer interrupt 100 is presented to interrupt controller 101, and does not interfere with application programs which use the IRQ0 interrupt. In another embodiment, not shown, the timer interrupt is presented on the IRQ0 pin of the 8259-compatible interrupt controller 101 and is IBM PC compatible. In this case, timer interrupt 100 may be used for determining the time of day as well as responding to other application program commands. In the embodiment of FIG. 3, the timer tick 100 interval is programmable to switch between the IBM PC-XT compatible 54.9 millisecond time interval and a one minute (approximately) time interval for power management and is not accessed by application programs. When the computer is in the off mode, the one minute interval is more desirable because it causes less processor 40 activity and thus less power consumption. The timer interrupt NMI 100 may be enabled by changing a particular bit in a register (F6E9<bit 4>) accessible to the microprocessor 40 (see port map, FIG. 5D). The timer interrupt 100 can be used by the control program to maintain command of the system even if an application program being executed revectors the timer interrupt IRQ0.

With regard to the keyboard interrupt circuitry 106, interrupts 104 presented on the IRQ1 pin of the 8259-compatible Interrupt Controller 105 are IBM PC compatible and may be used for keyboard services (responding to key presses). The keyboard interrupt NMI 104 also can be used by the control program to maintain command of the system even if a program revectors the service routine for the 8259-compatible Interrupt Controller 105. In order to conserve power, the microprocessor 40 clock may be stopped when it has been determined that a program is waiting for keyboard input. When an NMI 104 is generated as the result of keyboard activity, the processor 40 clock will restart again and the control program can allow processing to continue.

With regard to the on/off switch 114, once a user has finished using the computer for a period of time, the user can signal the control program that the user is finished by activating the on/off switch 114. When a user wishes to use the computer, he may activate the on/off switch 114 requesting the control program to start up the computer and resume exactly where he left off his previous usage. When the switch 114 is activated, an NMI 116 is generated as described above. An NMI routine is provided which will then determine that the on/off switch 114 caused the interrupt by examining the appropriate indicator 112 bit in a register F6EA <bit 0> accessible to the microprocessor 40 (see port map, FIG. 5D). The NMI routine then debounces the switch by repeatedly examining the real time status of the on/off switch 114 located in the particular register accessible to the microprocessor 40 until the signal is stable. Once the switch 114 has been debounced, the control program can move the system between the off and compute modes.

With regard to FIG. 3 as described above, the microprocessor 40 address lines 54, data lines 52 and control lines 56 are used to decode valid addresses for the circuitry as shown. The address decode and specific registers 60 include all the logic to decode the microprocessor addresses. Some addresses are used as interrupt masks 110. Other addresses correspond to status indicators 112 which the microprocessor 40 can read to determine the source of the interrupt. With regard to the interrupt controller 101, only those interrupts associated with power management are shown in FIG. 3. The interrupt controller 101 monitors all interrupt sources. If an interrupt 100, 104, 116 or 117 takes place then an NMI 102 is generated only if the interrupt 100, 104, 116 or 117 has been enabled as indicated by interrupt masks 110. The NMI interrupts 100, 104, 116, and 117 are enabled by changing the appropriate bits in a specific register such as F6E8 and F6E9 accessible to the microprocessor 40 (see port map, FIG. 5D). If an interrupt 100, 104, 116 or 117 is enabled and does occur, the source of the interrupt can be determined by examining the interrupt indicators 112 provided to the interrupt controller 101 through specific registers 60 accessible to the microprocessor 40.

With regard to the timer 100, this is the above mentioned system timer used for determining time of day and watchdog timer functions. The interrupt controller 101 may be programmed to cause an NMI 102 for each tick 100 of the timer 98. With regard to the keyboard control 106, the interrupt controller 101 may be programmed to cause an NMI 102 with each keypress, key release, or key repeat. With regard to UART Control 109, the interrupt controller 101 may be programmed to cause an NMI 102 with each receipt of a signal at the communications port. With regard to the on/off switch 114, the interrupt controller 101 is programmed to generate an NMI 102 any time this switch is activated.

Description of the Software Activity Detecting Circuitry

The above described interrupts provide several means for returning the computer to the higher power compute mode from one of its low power modes. The greater problem is when to take the computer out of the higher power compute mode, thereby extending battery life without inconveniencing the user. The problem is to determine when an executing software program is in a loop (in compute mode) looking for an external event such as a key press or a port signal and can be halted without halting desired operations in progress. In order to recognize unnecessary loop activities, it is necessary for the power management system of the present invention to anticipate how a software programmer will have written the code to place the program into one of these loops, and determine when the program can be safely halted without halting useful operations.

The badly behaved applications programs, which include many of the commonly available commercial application programs, often fulfill their input/output needs by direct hardware control rather than through the BIOS services. These badly behaved programs can prevent control program intervention and hence hinder system power management. In order to maintain the desired control of the system in accordance with the invention, the control program monitors various software activities of the application programs.

For determining when the microprocessor clock can be turned off during the execution of an application program, particular circuitry is included in the computer in accordance with the invention to detect the activity of software application programs. When a particular sought for activity is detected an NMI is generated if enabled.

As shown in FIG. 4, there are two kinds of software activities monitored by the power management system of the present invention. UART clock control monitor 128 monitors a software activity of waiting for a byte of information from the communications port or waiting for the proper time to place a byte of information on the communications port. Similarly, INTT16h trap 124 monitors a software activity of either waiting for a key to be pressed or looking at the keyboard buffer to see if a key press is stored. This interrupt INT16h is conventionally used for keyboard services on IBM PC compatible computers. Trapping a program using INT16h will allow the BIOS control program in the computer to maintain control of the system and thus continue to conserve power by stopping the processor clock between key presses.

Other software application program activities may be interspersed with activities for which it is otherwise possible to turn off the processor clock. When these activities are occurring, the microprocessor clock should not be turned off because the application program is not in an idle state and turning off the clock would delay the computer's response to the user. When these other activities are occurring, the microprocessor clock is not turned off in response to the NMI 126 generated by UART clock control interrupt 128 or the INT16h NMI interrupt 122 generated by an INT16h trap 124.

Activities monitored by the novel BIOS control program embodiment of FIG. 4 are an I/O read/write (communication with external devices such as a parallel printer, external memory, or other devices not handled by the UART) as monitored by I/O read/write monitor 132, UART activity (successive bits in a single byte sent to an RS-232 port) as monitored by UART activity monitor 134, waiting for a tick of the programmable interval timer 107 as monitored by programmable interval timer 136, writing to a screen, as monitored by video access monitor 138, and writing to or reading from disk, as monitored by mass storage monitor 111. Mass storage monitor 111 is shown in both FIG. 3 and FIG. 4 because the single bit of data provided by mass storage monitor 111 indicates activity of both hardware and software. Additional instructions which are not shown in FIG. 4, but can also be monitored include CPU opcodes (for example, multiply).

As provided by the control program, the CPU places on the address bus 54 and control lines 56 the address of these registers 132, 134, 136, 138, and 111. Data are in return provided on data lines 52 indicating to CPU 40 the status of the activity being examined.

When any of these activities are being performed by the application programs, related bits are set in address decode and specific registers 60 through data line 52b, and prevent the turning off of the CPU 40 clock. By detecting activities requiring the microprocessor clock to be running interspersed with other activities which if alone would not inconvenience the user if the clock were off, it is possible to use lower criteria for repeated activity of the INT16h trap and UART clock control in determining when to turn off the clock.

The reason the programmable interval timer activity becomes a reason not to turn off the clock in spite of apparently idle activity, is that programmers use this programmable interval to control the speed of other events, for example movement of objects across the screen in a game program, and turning off the computer would interfere with the rhythm of the program. Further, when the program was turned back on, the loop would be entered again, such that programs using the programmable interval timer could not be operated under the power management system of the present invention.

The following describes the circuitry 124 and 128 which looks for the INT16h and UART software activities. First, regarding the INT16h trap 124, a software INT16h instruction causes the microprocessor 40 to read four bytes from the computer memory (not shown) starting at the address 58h bytes from the beginning of the interrupt vector table. The INT16h interrupt 122 is intended to trap a software event that is the execution of the INT16h instruction. Since each interrupt vector occupies four bytes in the interrupt vector table, circuitry 124 is provided to monitor the first byte of the table entry for INT16h, which is located 58h bytes from the beginning of the interrupt vector table in low memory. Any read of data by CPU 40 from this memory address can cause an NMI 122. If an interrupt 122 is generated, an indicator bit in a particular register (F6E4<bit 7>) accessible to the microprocessor 40 is set (see port map, FIG. 5C).

The novel software associated with trapping typical software events functions as follows. With regard to the INT16h interrupt 122, the goal, as described above, is to trap a software program which has issued the INT16h instruction. Since this interrupt 122 is typically used for keyboard servicing, intercepting an INT16h instruction allows the control program to detect an applications program looking for keystrokes. If the novel control program of the present invention obtains an NMI 122 caused by INT16h, the control program examines the argument (i.e., a particular INT16h service) passed to the INT16h interrupt handler and indicates what the calling applications program was trying to accomplish.

The simplest function for which power saving can be initiated is the call to wait for a key to be pressed. If the calling applications program wanted to wait for a key to be pressed, then the microprocessor can be stopped immediately until a key is pressed. However, if the applications program is periodically checking the keyboard buffer with an INT16h call to see if a key has been pressed, then a guess may be made based on, for instance, statistics (i.e., how many times the INT16h interrupt 122 was invoked per time period) to decide if and when the processor 40 clock should be stopped.

Since the display controller logic is designed to conserve power also, (see commonly assigned U.S. patent application Ser. No. 07/374,884, now abandoned entitled Video Image Controller for Lower Power Computer, invented by Leroy D. Harper, John W. Corbett, Douglas A. Hooks, Grayson C. Schlichting, Renee D. Bader, and John P. Fairbanks, attorney docket no. M-963, and incorporated herein by reference) certain control program intervention may be required when software application programs access the video display of the computer. Some application programs allow for a user to interrupt the application program while the application program is in the midst of writing to the screen. These application programs will insert INT16h calls into other screen writing activities. Such INT16h calls should not be used to turn off the microprocessor. Means for distinguishing INT16h calls during screen writes from INT16h calls in other loop activities waiting for outside input are discussed later. However, as discussed above under display power management, the present invention allows for the microprocessor clock to be turned off while the screen is being refreshed but its contents are not being changed. The screen refresh is not handled by the microprocessor and can proceed normally even though the microprocessor is turned off. Thus, the display controller controls two functions, generating characters to be displayed on the screen which requires the microprocessor to be on, and refreshing a static screen which does not require the microprocessor to be on. A bit is set to alert the control program of the display controller status, in particular when the display controller is performing a screen write which requires the microprocessor to be on.

Applications programs which use the UART directly without the aid of BIOS would find the communications system unstable or unusable when used with the power management system of the present invention if no provision were made for stabilizing the lock oscillator before connecting the clock. In order to assist such applications programs, an NMI is enabled to cause a delay loop when a write or read from the UART occurs. With regard to the UART interrupt 126 shown in FIG. 4, any read or write to an address specific to the UART 128 will cause an NMI 126 if enabled by changing an appropriate bit in a particular register accessible to the microprocessor 40. This information is used by the control program to monitor the start-up of the UART clock oscillator to ensure that the UART baud clock oscillator (not shown) is stable before a program is allowed to proceed with further UART activity. This information is also used by the control program to know when another applications program is utilizing the UART through direct hardware control techniques. This is not possible on a typical prior art IBM PC-XT compatible computer.

Power Management Software

The conventional ROM BIOS functionality available in prior art computers is extended in accordance with the present invention by means of additional software functions and services, which are accessed by any application program through a conventional interface of software interrupts as used by ROM BIOS and MS-DOS. The IBM PC-XT compatible ROM BIOS function designated "get keypress" operates non-conventionally in accordance with the invention to power off as much of the computer system as possible at any one time, instead of sitting in an idle loop as is done in the prior art computers. This function is linked to circuitry so that the enhanced software is invoked when a keypress is detected. The conventional IBM PC compatible ROM BIOS function "get keyboard status" is modified so that a count of the number of times a call is made to this function over a given time period is monitored. After a certain time, it is safe to assume that the application program is idle, that is, waiting for user input. If the conditions of the algorithm are satisfied then it is safe to stop the microprocessor until a key is pressed. The microprocessor may be stopped whenever there has been no keyboard or significant microprocessor computing activity for a given time, i.e., preferably approximately 100 milliseconds.

The algorithm for determining when the microprocessor can safely be shut off according to the above requirement for a given time is to count the number of times an INT16h call has been made during an interval between timer ticks, and shut off the microprocessor when the number exceeds a specified value.

However, it is not preferred to check for an application program being haltable simply by counting the number of times the program has used INT16h to check the keyboard buffer since the last key press. An absolute number of checks has been shown with a variety of application programs either to cause the computer to turn off the program when other significant computation is going on (a condition unacceptable to the user) in the case when the number of checks between timer ticks has been set too low, or to cause the computer to remain on when the program is in a loop (a condition which shortens battery life). Application programs have been observed to send INT16h commands as few as seven times per timer tick and as many as 250 times per timer tick, both extremes occurring in programs which were in a repetitive loop during which the microprocessor could be turned off. However, programs which are performing other useful operations such as writing to memory have been observed to make as many as 10 INT16h calls per timer tick, and would be erroneously shut off by an algorithm which used the criterion of requiring only seven INT16h calls per timer tick.

Figure 7A:
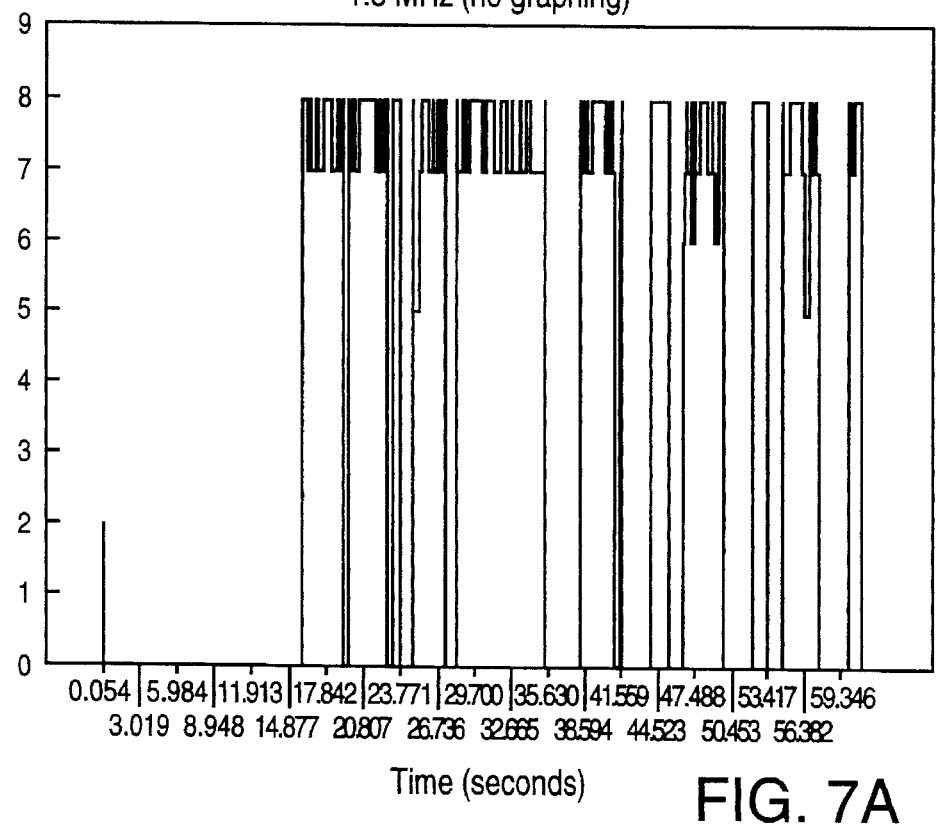
FIGS. 7A through 7G show patterns of interrupt call frequency which occurred in three representative application programs operating under a variety of conditions.

FIGS. 7A through 7G show results of these application program observations. FIG. 7A shows a graph of many observations of a Lotus 123 program's use of INT16h calls when the processor is operating at a 1.3 MHz rate and timer ticks are occurring every 54.9 milliseconds. FIG. 7A accumulates observations of the Lotus 123 program's behavior over approximately a 1-minute period. During the first approximately 15 seconds after the observations begin, the program is performing a calculation during which it looks for key presses with INT16 calls only twice during one of the timer tick periods. Between 15 seconds and 19 seconds, the program looks for key presses about 7 or 8 times between timer ticks. At about 19 seconds, the program ceases looking for key presses for a short time while other computations are performed in response to a key press. Such activity occurs again at approximately 23 seconds. At approximately 24 seconds a lengthier calculation prevents INT16h calls for key presses. Thus the microprocessor could have been off for most of the time between 15 and 23 seconds. An algorithm for saving power must recognize this possibility. It is clear from the general shape of the graph of FIG. 7A that the frequency of INT16h calls has only a few values, predominantly zero and 7 or 8. (The value 7 or 8 probably represents the same loop, and the difference of one simply represents round-off error.)

Figure 7B:
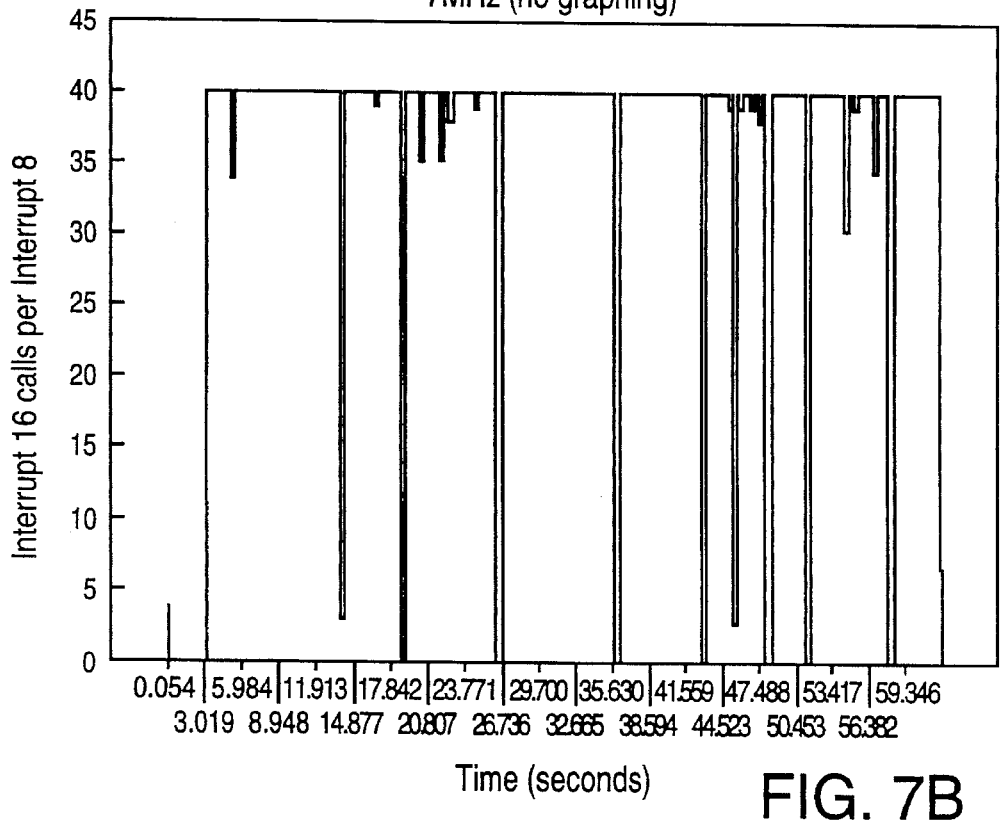
Figure 7C:
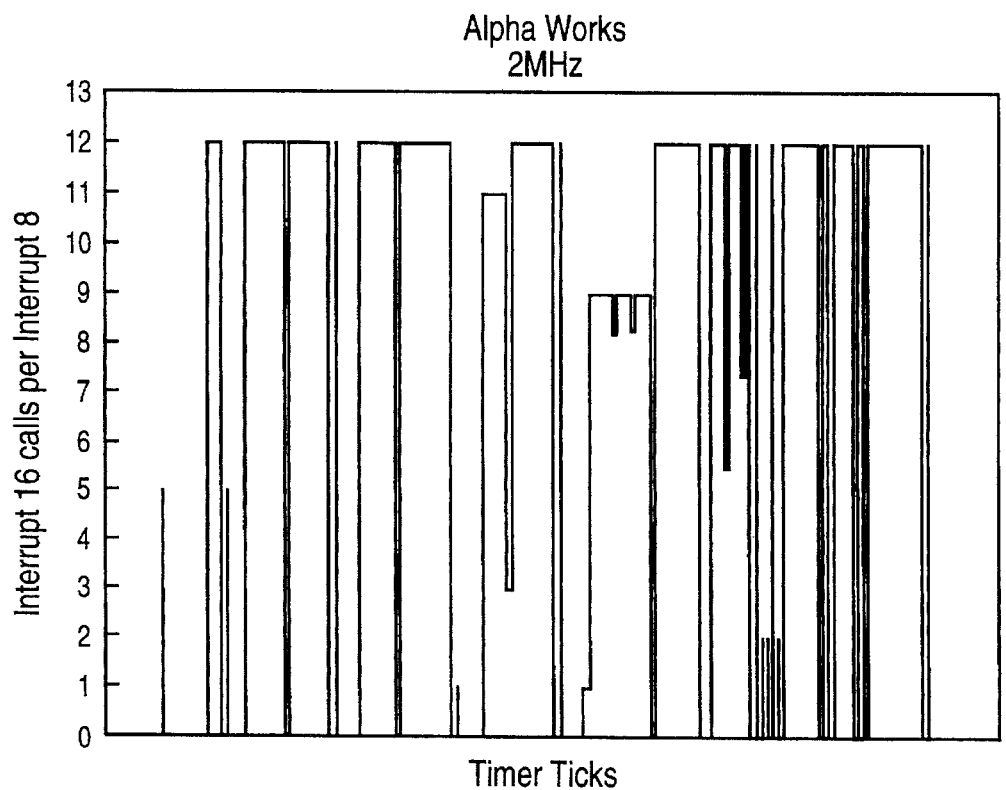
Figure 7D:
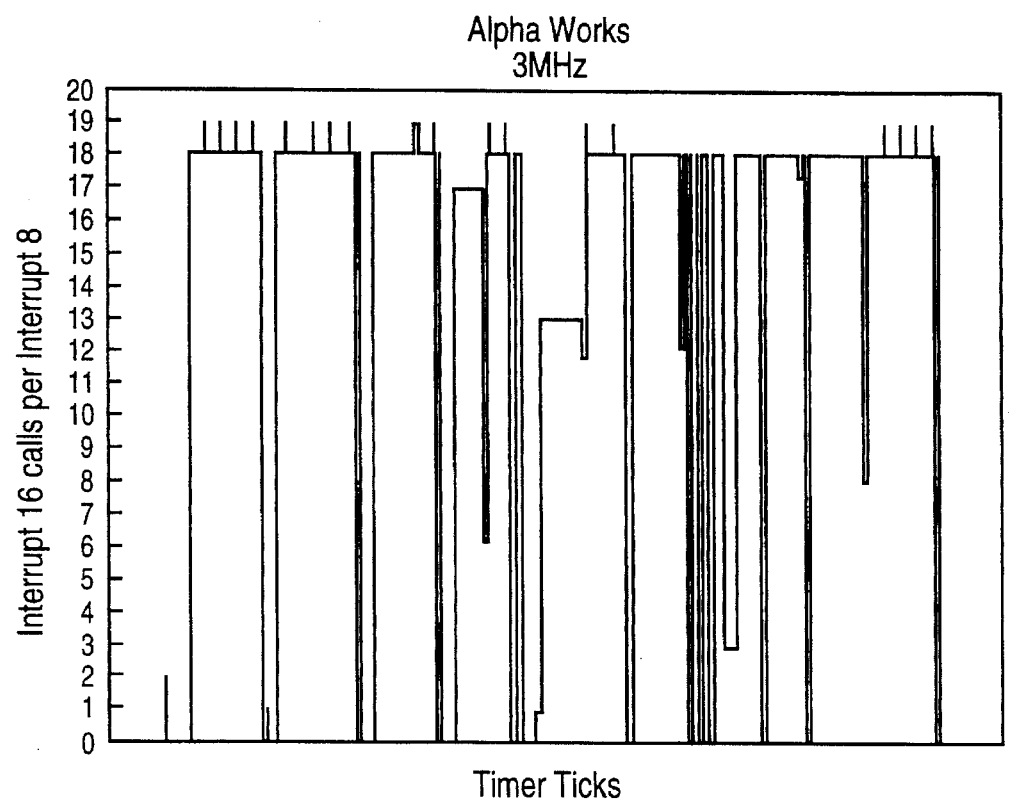
Figure 7E:
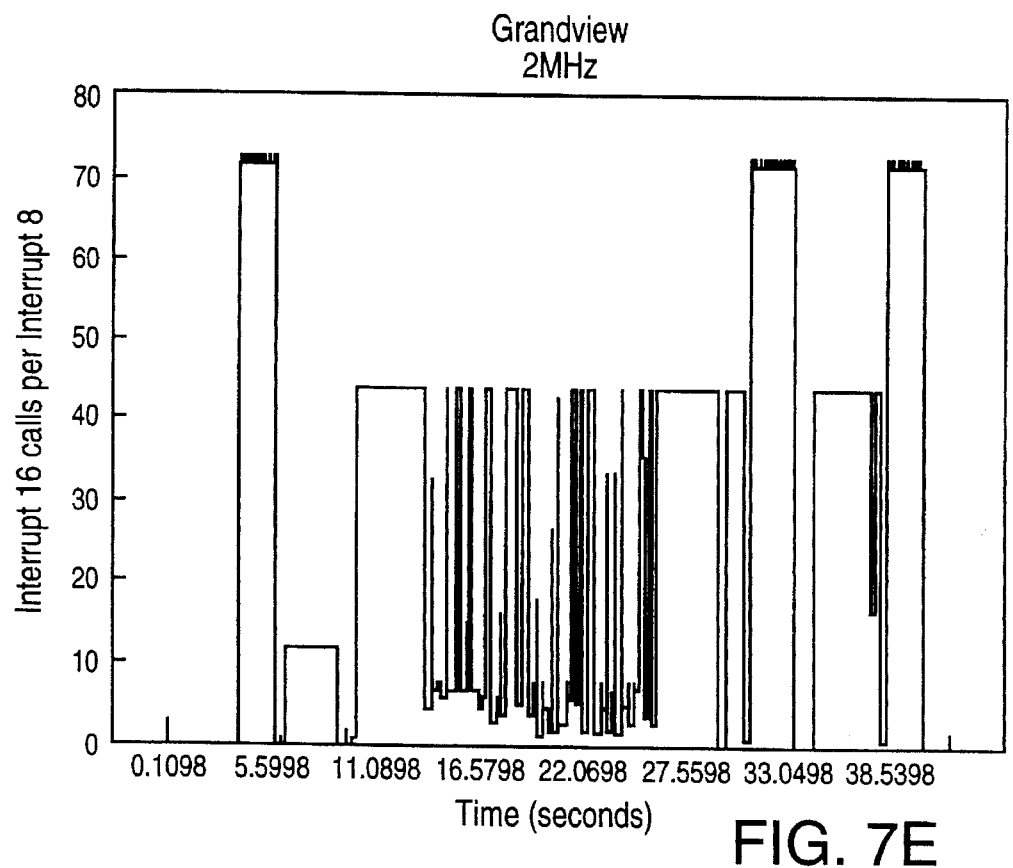
Figure 7F:
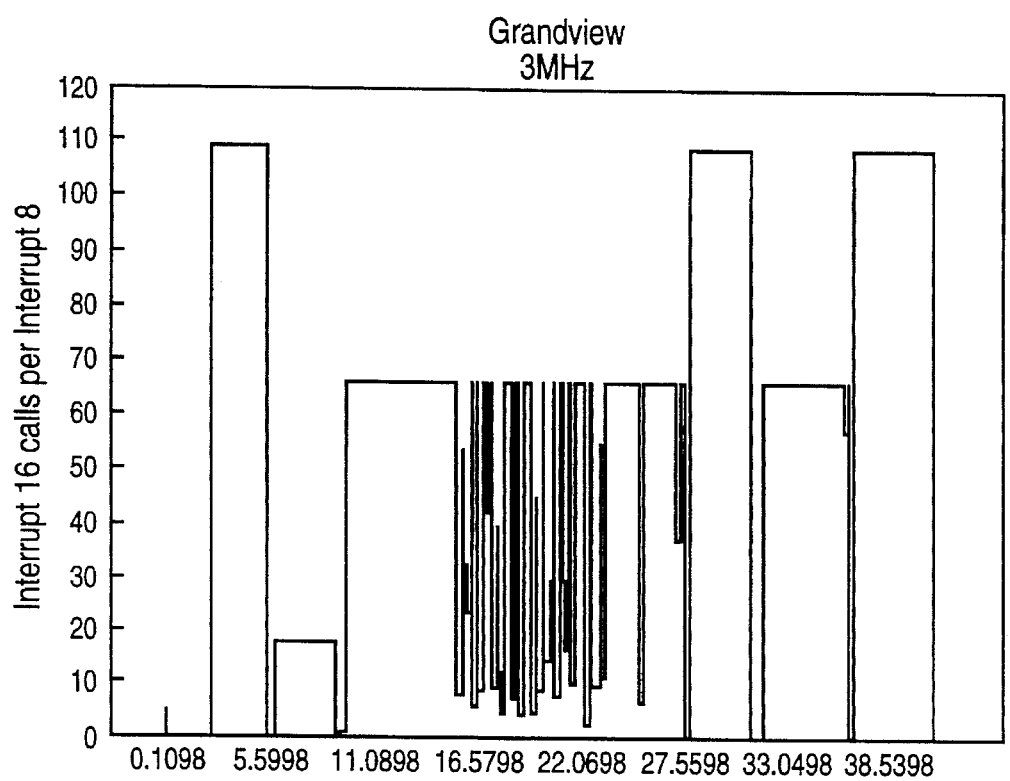
Figure 7G:
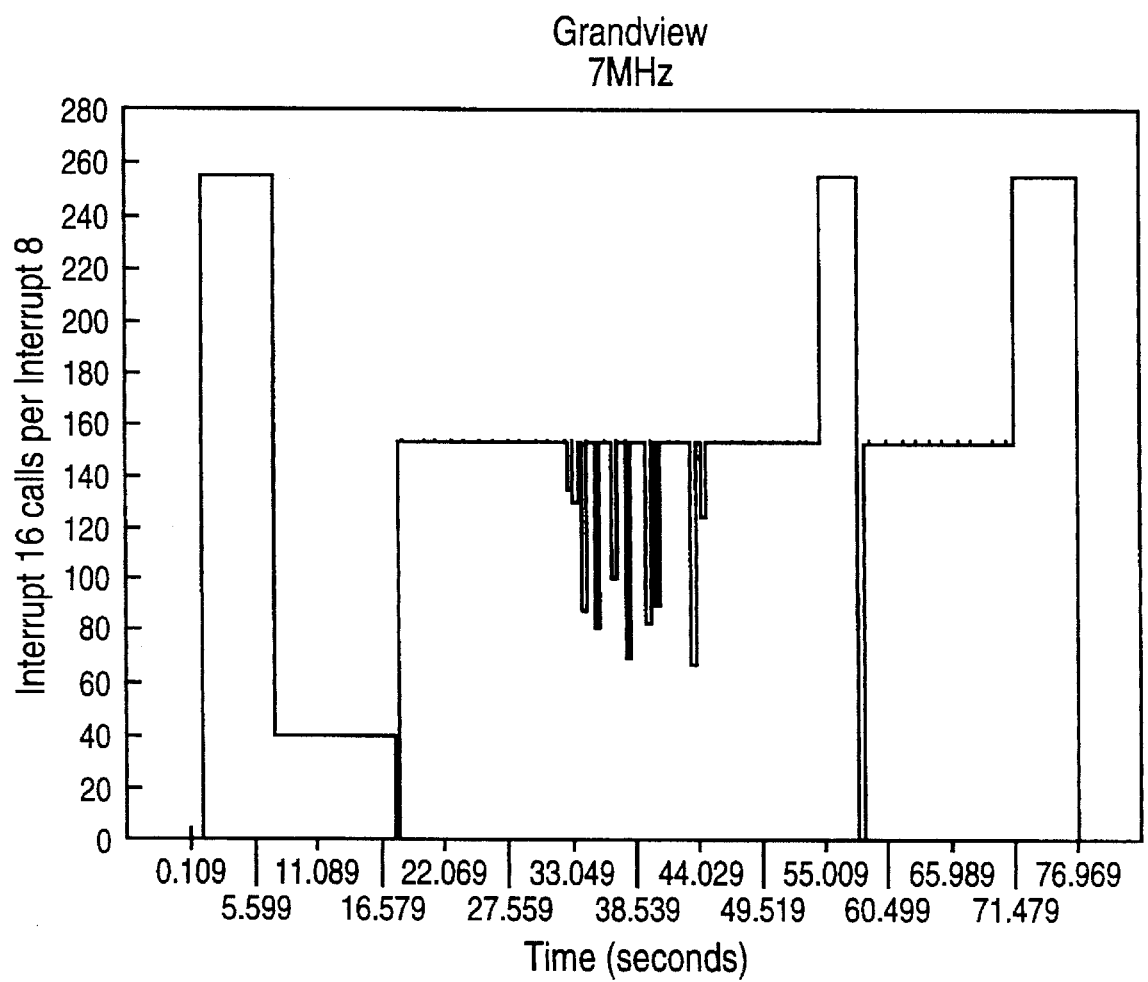

As shown in FIG. 7B, the same Lotus 123 program running at a 7 MHz clock speed repeats its loops more frequently between timer ticks of 54.9 milliseconds. Thus, the INT16h calls almost always occur approximately 40 times per timer tick when they occur at all, the vertical white lines indicating zero times per timer tick when active computing is being done. Most of the black portion of the graph represents time when unnecessary power is being consumed needlessly running the microprocessor, and for which an algorithm is desired for turning off the microprocessor.

A more sophisticated algorithm improves the power management ability of the present invention. One such algorithm which allows hardware to detect most loop activity which could be eliminated by turning off the microprocessor and which does not cause the microprocessor to be turned off when useful computation is occurring is to compare the number of INT16 calls during one timer tick interval to the number of INT16h calls during the previous timer tick interval. If these numbers are the same (or differ by only one count), it is likely that the computer is in a loop and that the microprocessor can be turned off. Finding two time periods with the same number of INT16h calls in which the number is greater than a minimum value of about 4 is an algorithm for turning off the microprocessor which is much preferred over providing an absolute count which must be exceeded during a timer tick interval. Another algorithm which gives more assurance that the microprocessor will not be erroneously turned off, and which uses only a small amount of additional power, involves requiring a string of three intervals during which the number of INT16 calls differs by no more than one.

The computer, however, need not be fully turned off. In the case of an application program waiting for a keypress, all sections of the computer are turned off with the exception of the video display. The computer is then in display mode and appears to the user to be continuously on, as keys are periodically pressed, or communications are sent and received. If there continues to be no activity for a longer given time, i.e., preferably approximately four minutes, then the video display is turned off and the computer is in the off mode.

In accordance with the invention, the problem of coping with badly behaved applications programs is solved by providing hardware circuitry to notify the control program software if an application is taking over control of the ROM BIOS keyboard services. This method is accomplished by having the hardware monitor a particular fixed memory location as defined by the conventional IBM PC-XT specification used for the software interrupt to access keyboard services, and alerting the ROM BIOS if this occurs.

Figure 6:
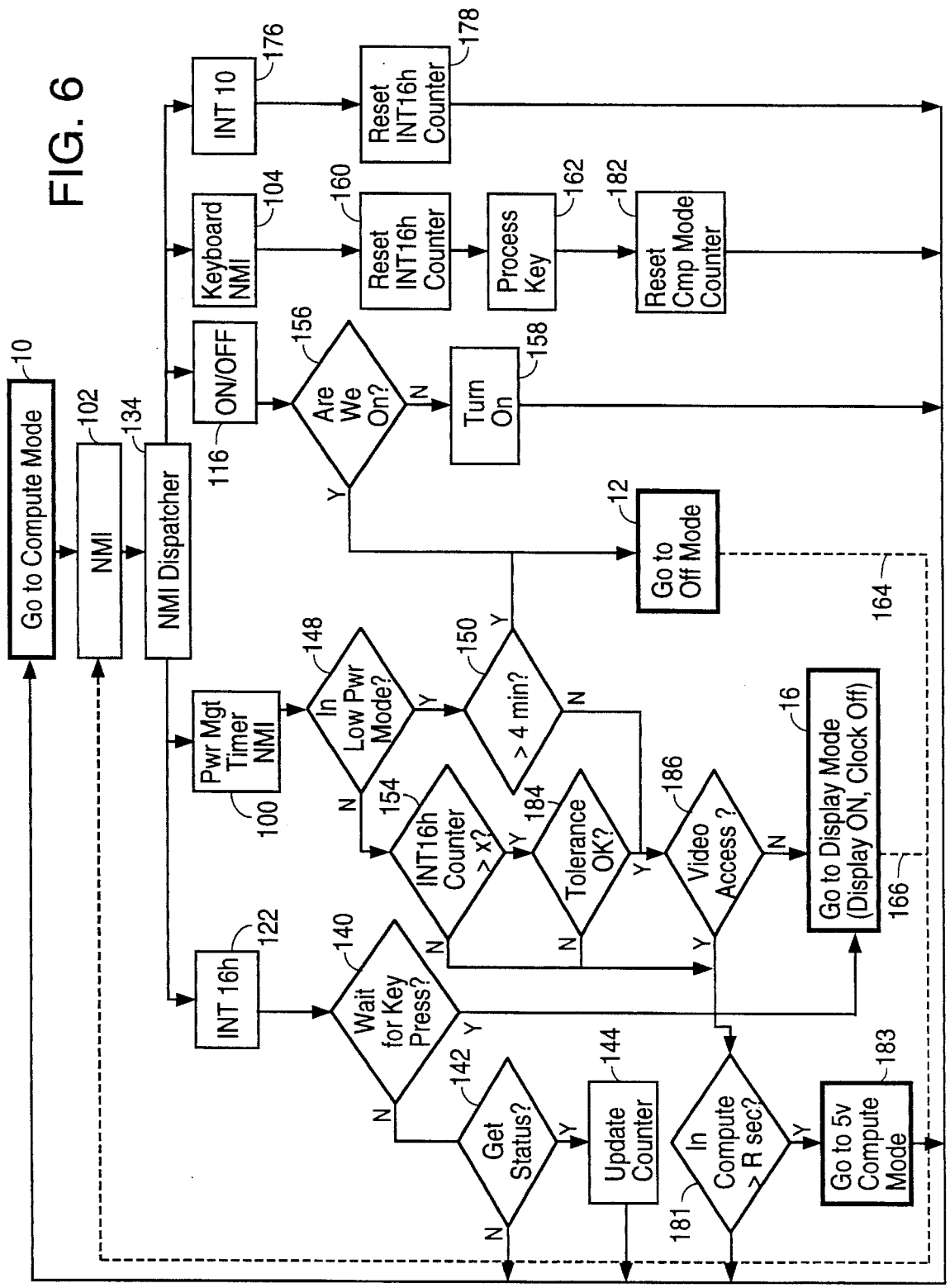
FIG. 6 shows a flowchart of the low power management software.

FIG. 6 Flow Chart for Power Management

The power management control program in accordance with the invention is illustrated in flow chart form in FIG. 6. As shown in FIG. 6, at the top of the flow chart the system is in the compute mode 10. The computer can be put into compute mode by a variety of events. The novel control program first monitors the computer circuitry to determine what caused a nonmaskable interrupt 102 (NMI) to place the computer into compute mode 10. This part of the control program is referred to as the NMI dispatcher 134. In the case of the power management portion of the control program, there are five activities which the NMI dispatcher 134 is looking for.

These five activities are, in the preferred embodiment of the invention, software interrupt 122 (i.e., INT16h) from trap 124 (see FIG. 4), timer tick interrupts 100 (see FIG. 3), interrupt 116 from the activation of the on/off switch 114 (see also FIG. 3) keyboard interrupts 104 (INT9) (also see FIG. 3) and screen write interrupt 176 (i.e., INT10). The on/off switch 114 is described above. The timer tick interrupt 100 as described above is provided every 54.9 milliseconds (i.e., 18.2 times a second) and is programmably switchable as described above to approximately 1 tick per minute.

Keyboard interrupts 104 are generated by the keyboard control circuits 106 of FIG. 3 each time a key is pressed, released, or held long enough for it to repeat. In accordance with a preferred embodiment of the invention, the keyboard control circuits 106 (which in conventional systems are provided by a separate device) are provided in an ASIC in the computer. Preferably both the scanning and decoding of the keyboard signals are performed in this ASIC.

Response to interrupt INT16h trap 122 operates as follows: after receipt of interrupt INT16h trap 122, the control program determines what function the software program was trying to accomplish when it issued the INT16h instruction. Two possible functions are first, waiting for a keypress 140 and second of all, obtaining keyboard status 142. In the case of waiting for a keypress 140 the system can immediately go to display mode 16, in which the display is on and the other hardware elements of the computer are off. This is what happens when the computer is not computing and typically waiting for the user of the computer to type. In the case when INT16h is used to obtain keyboard status 142, the control program increments a counter 144. This counter 144 counts the number of times the keyboard status 142 was checked using the INT16h instruction since the last timer tick 100. The point is that if the application program is in a low intensity processing mode or a zero intensity processing mode, the keyboard status 142 will be checked many times. Thus within a short time period there will be many counts accumulated in the counter 144. This usually indicates that no significant amount of processing is going on. As mentioned earlier, however, it is preferable to compare the number of counts since the last timer tick 100 to the number of counts in the previous interval, since different software programs have widely different rates of using the INT16h interrupt to check keyboard status. Thus after updating the counter at step 144, the control program returns the computer to compute mode 10 in which the application program proceeds with its next instruction. It is possible that many NMI 102 interrupts will turn out to be INT16h interrupts 122, that they will be status requests 142, and that the counter will again be updated, returning the computer to compute mode. After some period of time, however, an NMI 102 interrupt will be found by NMI dispatcher 134 to have been caused by a timer interrupt from a timer tick 100. This timer interrupt 100 causes the computer to enter a part of the program for determining whether it is safe to turn off the microprocessor and halt the program being executed without interfering with functions the user wants to perform.

The following describes the operation of the control program with regard to the timer tick interrupt 100. After the NMI dispatcher 134 determines that the interrupt is a timer interrupt 100, the control program at 148 determines whether the computer is in the display (low power) mode 16 or off mode 12. At this point, if the computer is in the display mode 16, the control program at 150 determines if the computer has been in the display mode 16 for a predetermined period of time such as greater than two to four minutes. If the control program determines the computer was in off mode 12, it returns the computer to off mode 12. If the system is in the display mode 16, but at 150 has been in that mode for less than a time of approximately four minutes, then the system remains in the display mode 16. If the computer has been in the display mode 16 for a period of greater than four minutes, which means that a key press or other activity which moves the computer into compute mode 10 has not occurred for four minutes, the control program puts the system into the off mode 12. The off mode 12 described above with regard to FIG. 1 is a state in which the display is off, the microprocessor is off, the other sections of the computer are off, and the timer is slowed down to approximately 1 timer tick per minute. In off mode, the timer interrupts 100 (see FIG. 3) cycle the control program of FIG. 6 through the compute mode 10 and back to the off mode about once per minute.

If the timer interrupt 100 causes the control program to determine at step 148 that the computer is not in a low power mode (thus it is in compute mode, communication mode, or DMA mode as shown in FIG. 1), then at step 154, the INT16h counter is examined to determine if the number of INT16h interrupts since the last timer interrupt 100 is greater that a minimum number. A presently preferred minimum number is five. If this minimum number such as five is exceeded, the control program makes a comparison at step 184 between the number of INT16h interrupts in the last timer tick interval just completed and the number of INT16h interrupts in the previous interval. Alternatively, the control program may compare the number of INT16h interrupts in three succeeding intervals. A counter stores the number of INT16h counts in several successive timer tick intervals and the control program continues to make this comparison once for every timer interrupt 100.

If at step 184 the control program determines that the number of INT16h interrupts in the INT16h counter differs from the number in the previous interval, indicating that some less repetitive activity is occurring, even if the number of INT16h interrupts is greater than the minimum number (such as five), the control program will not turn off the microprocessor clock and stop the executing application program, but will move to step 181.

Regarding step 181, a power saving device described more completely in copending application Ser. No. 07/374,514, which is now U.S. Pat. No. 5,021,679, incorporated herein by reference, switches the system power supply voltage from a low voltage in the range of 2 to 3 volts to 5 volts only when the computing requirements are intense. The higher voltage causes the voltage controlled oscillator which drives the microprocessor clock to run at a faster speed, in the present case to speed up from about 2 MHz to about 7 MHz. When the faster computing speed is not needed, the computer operates at lower power and lower speed, thereby saving considerable power. When the computer first enters compute mode 10, the voltage is at the lower level. Step 181, which is reached every time a power management timer interrupt 100 occurs determines whether the computer has been in compute mode more than R seconds, presently preferred to be 1.5 seconds. If the computer has been in compute mode 10 less than 1.5 seconds, the program returns control to the application program in compute mode 10 and the system power supply remains at the low voltage. If the computer has been in compute mode more than 1.5 seconds, the control program at step 183 activates circuitry which increases the voltage of the system power supply to 5 volts. This in turn causes the voltage controlled oscillator which drives the microprocessor clock to speed up, giving the user quicker response to heavier computing requirements.

If the number of INT16h interrupts in two or three successive intervals differs by not more than a count of one (for round-off error), then at step 184 the tolerance is determined to be OK (the activity is determined to be repetitive).

There are application programs which use an INT16h call fairly frequently intermixed with other computations which should not be halted. Some of these uses will produce INT16h calls in such a regular pattern that the above algorithm for comparing INT16h calls during two or three successive timer tick intervals will find identical numbers of calls and would erroneously turn off the microprocessor in the midst of an operation if no other tests were made. Examples of these activities are writing to the screen, writing to mass storage memory, and sending or receiving from a communications port. In order to avoid erroneously turning off the computer during a computation, the control program checks for these activities. Variations of the control program check for different specific activities. The control program shown in FIG. 6, after determining at step 184 that two or three successive intervals have the same number of INT16h calls, checks at step 186 to see if a screen write command (a video access command) has been given since the last occurrence of timer interrupt 100. A variation on the block diagram of FIG. 6, discussed in connection with FIG. 4, includes additional tests for disk or other memory access and communications port access, with the answer to each question being "no" before the program moves to the low power display mode 16, in which the microprocessor clock is off and the executing computer program is halted. A further variation provides for forming a table of frequency of INT16h calls made by different programs and turning off when the number of INT16h calls matches the value in the table. Similarly, at the beginning of an application program, the control program can begin to form a history of INT16h call frequency and start responding to a particular frequency of INT16h calls when the history indicates the current frequency is equal to the stable value. When the microprocessor clock is off, the transistors necessary for moving quantities into and out of memory and other such hardware operations necessary to respond to software commands are halted, and use of power is markedly reduced.

If the control program determines at step 186 that the application program is writing to screen (video access), or in another variation writing to mass memory, reading from mass memory, writing to the communications port or reading from the communications port (or other tests which may be preferred in a particular embodiment), the control program returns to compute mode 10, and the application program takes over again.

Interrupt 116 is generated by the on/off switch 114 (see FIG. 3) as described above. When the user activates the on/off switch, then an NMI 116 is generated. The activation of the on/off switch means, as determined at 156, either that the computer is on and is being turned off or that the computer is off and is being turned on. Thus as shown at step 156 if the computer status is that it is on, activating the switch puts the computer into the off mode 12. If the computer is off at 156 then activating the on/off switch causes the timer tick circuit to be reprogrammed at 158 to provide timer ticks every 54.9 milliseconds. (As stated above, other intervals may be selected.) The memory locations associated with keeping time of day information are updated to reflect the transition to timer ticks every 54.9 milliseconds instead of once per minute, then the computer is returned to the compute mode 10. Updating of the time of day information is performed by reading a counter which counts and accumulates the number of 54.9 millisecond time periods which have passed since the counter was last cleared. This counter preferably clears itself once per 1024 time periods (56.2 seconds).

The next interrupt relevant to the power management system is the keyboard interrupt 104, preferably INT9. As described above interrupt 104 is generated by the keyboard control circuitry 106 (see FIG. 3) when a key is pressed or released. Upon generation of a keyboard interrupt 104 the above described INT16h counter 144 is reset at step 160. After this the key input is processed at 612 by the computer and control is returned to the application program in compute mode 10. As shown by the doted lines 164, 166, both the off mode 12 and the display mode 16 return control to the NMI dispatcher 134 periodically as determined by the system timer tick interrupt 100.

The last interrupt relevant to the power management system embodiment of FIG. 6 is screen write INT10 interrupt 176. INT10 is a standard BIOS call to cause a screen write. The INT10 interrupt causes the BIOS to access the screen, as was done by the video access call tested by hardware in block 186 discussed earlier. Another embodiment, not preferred, responds to the INT10 call but does not detect at 186 a direct video access. Indeed, if direct video access is detected at 186, detecting the INT10 call is not necessary, but is preferred to give faster response before waiting for timer interrupt 100.

Finally, manual means are also provided for putting the computer into computer mode 10. There are programs which will likely be erroneously shut off by the power management system of the present invention if the embodiment selected has parameters which produce significant power savings. In order to allow such programs to run successfully, the computer preferably includes means, for example a combination of keystrokes, for disabling the power management feature of the present invention. This disabling means is preferably used only when the user has encountered a problem with the power management system. In one embodiment a key press or key combination causes power management to be overridden. Overriding is accomplished in this embodiment by disabling the timer interrupt 100 generated by timer 98.

In accordance with the invention, the control program as described above is preferably written in assembly language and is installed in ROM associated with the computer microprocessor. This preferred assembly language is that which is conventionally used for the Intel 8086 family of microprocessors.

A control program in accordance with the invention is also shown in a Microfiche Appendix to the above-referenced U.S. patent application Ser. No. 07/375,721, now abandoned, entitled Portable Low Power Computer, attorney docket no. M-968. Parts of the program relevant to the control power management function are shown at pages 84–108 of the program.

The above description of the invention is illustrative and not limiting. Other embodiments of the invention will be apparent to one of ordinary skill in the art in the light of the invention. The invention is not limited to IBM PC XT compatible computers or to IBM PC compatible computers. Also, the particular hardware and software embodiment of the invention as described above are not intended to be limiting, but illustrative. In other embodiments of the invention more or less of the functions are provided in hardware and/or software.

We claim:

1. A method for reducing power consumed by a computer having a processor for executing at least one application program and having a manual input device for inputting data to the processor, the application program generating interrupts to call for receiving the data input from the manual input device, the method comprising the steps of:

during execution of the application program, counting a first number of the interrupts generated by the application program during a first time interval of predetermined duration;

counting a second number of the interrupts generated by the application program during a second time interval of equal duration and subsequent to the first;

determining a difference between the first number and the second number; and reducing power consumed by the processor if the difference is within a predetermined range.

2. The method of claim 1, wherein the step of reducing power is undertaken only if the first number is at least four interrupts per a time interval of 1/18 second duration.

3. The method of claim 1, wherein the step of reducing power comprises the step of turning off a clock signal, said clock signal being provided for controlling the processor.

4. The method of claim 3, further comprising, after the step of reducing power, the step of externally turning on said clock signal.

5. The method of claim 3, further comprising, after the step of reducing power, the step of turning on said clock signal in response to detection of a data input from the manual input device.

6. The method of claim 1, wherein said interrupts are calls for a status of the manual input device.

7. The method of claim 1, wherein the manual input device is a keyboard.

8. The method of claim 1, wherein the step of reducing power includes the step of operating the processor at a reduced clock frequency.

9. A method for reducing power consumed by a computer having a processor for executing at least one application program and having a manual input device for inputting data to the processor, the application program generating interrupts for receiving the data from the manual input device, comprising the steps of:

during execution of the application program, counting a first number of the interrupts generated by the application program during a first time interval of predetermined duration;

counting a second number of the interrupts generated by the application program during a second time interval of equal duration and subsequent to the first;

counting a third number of the interrupts generated by the application program during a third time interval of equal duration and subsequent to the second; and reducing power consumed by the processor if the third number is within a predetermined value of both the first and second numbers.

10. The method of claim 9, wherein the step of reducing power includes the step of operating the processor at a reduced clock frequency.

11. An apparatus for reducing power consumed by a computer having a processor for executing at least one application program and having a manual input device for inputting data to the processor, the application program generating interrupts to call for receiving the data from the manual input device, comprising:

means for counting a first number of the interrupts generated by the application program during a first time interval of predetermined duration during execution of the application program;

means for counting a second number of the interrupts generated by the application program during a second time interval of equal duration and subsequent to the first;

means for determining a difference between the first and second numbers, the means for determining being operatively connected to each of the means for counting; and means for reducing power consumed by the processor if the difference is within a predetermined range, the means for reducing power being operatively connected to the means for determining a difference.

12. The apparatus of claim 11, further comprising a timing signal generator for generating clock signals for controlling the processor and being operatively connected to the processor; wherein the means for reducing power comprises means for turning off the timing signal generator.

13. The apparatus of claim 11, wherein the means for reducing power includes means for operating the processor at a reduced clock frequency.

* * * * *